US010436600B2

(12) United States Patent
Tayama et al.

(10) Patent No.: US 10,436,600 B2
(45) Date of Patent: Oct. 8, 2019

(54) VEHICLE IMAGE DISPLAY SYSTEM AND METHOD

(71) Applicants: Shuichi Tayama, Tokyo (JP); IMAGE CO., LTD., Tokyo (JP)

(72) Inventors: Shuichi Tayama, Tokyo (JP); Yukio Watanabe, Tokyo (JP)

(73) Assignees: Shuichi Tayama, Tokyo (JP); IMAGE CO., LTD, Tokyo (JP)

( * ) Notice: Subject to any disclaimer, the term of this patent is extended or adjusted under 35 U.S.C. 154(b) by 0 days.

(21) Appl. No.: 15/559,290

(22) PCT Filed: Mar. 10, 2016

(86) PCT No.: PCT/JP2016/057551
§ 371 (c)(1),
(2) Date: Sep. 18, 2017

(87) PCT Pub. No.: WO2016/152553
PCT Pub. Date: Sep. 29, 2016

(65) Prior Publication Data
US 2018/0058879 A1 Mar. 1, 2018

(30) Foreign Application Priority Data
Mar. 26, 2015 (JP) ................................. 2015-064298

(51) Int. Cl.
G09B 29/10 (2006.01)
G06T 11/60 (2006.01)
(Continued)

(52) U.S. Cl.
CPC .......... G01C 21/3676 (2013.01); B60K 35/00 (2013.01); B60K 37/02 (2013.01);
(Continued)

(58) Field of Classification Search
None
See application file for complete search history.

(56) References Cited

U.S. PATENT DOCUMENTS 6,282,489 B1 * 8/2001 Bellesfield ......... G01C 21/3676
701/426
7,088,262 B2 8/2006 Schindler et al.
(Continued)

FOREIGN PATENT DOCUMENTS

JP H10-105885 A 4/1998
JP 2001-199295 A 7/2001
(Continued)

OTHER PUBLICATIONS

PCT/ISA/210, "International Search Report for International Application No. PCT/JP2016/057551" dated May 10, 2016.

Primary Examiner — Yanna Wu
(74) Attorney, Agent, or Firm — Manabu Kanesaka

(57) ABSTRACT

In a vehicle image display system, a travel behavior of an own vehicle during automated driving to be subsequently performed is previously noticed to an occupant with display to be recognized intuitively and instantaneously. A vehicle image display system includes a first display device that uses a front windshield as a display screen and a second display device as a monitor device mounted on a dashboard, and displays, on a display screen of each display device, a moving image of a virtual image of the own vehicle travelling on an arrow of a symbol image indicating a travel course for lane change as having the arrow as a trajectory therefor so as to visually provide prior notice of the lane change to the occupant when the own vehicle in the automated driving system is about to perform the lane change as being deviated from a scheduled travel course.

8 Claims, 25 Drawing Sheets

(51) Int. Cl.
| | |
|---|---|
| *G01C 21/36* | (2006.01) |
| *B60K 35/00* | (2006.01) |
| *B60K 37/02* | (2006.01) |
| *B60R 21/00* | (2006.01) |
| *G09B 29/00* | (2006.01) |
| *B60W 30/12* | (2006.01) |
| *B60W 30/16* | (2012.01) |
| *B60W 30/18* | (2012.01) |
| *B60W 30/14* | (2006.01) |
| *G01C 21/26* | (2006.01) |
| *G08G 1/16* | (2006.01) |
| *B60R 1/12* | (2006.01) |
| *G05D 1/00* | (2006.01) |
| *B60W 50/14* | (2012.01) |

(52) U.S. Cl.
CPC ............ *B60R 21/00* (2013.01); *B60W 30/12* (2013.01); *B60W 30/16* (2013.01); *B60W 30/18163* (2013.01); *G06T 11/60* (2013.01); *G09B 29/00* (2013.01); *G09B 29/10* (2013.01); *B60K 2370/184* (2019.05); *B60K 2370/334* (2019.05); *B60R 2001/1253* (2013.01); *B60R 2300/105* (2013.01); *B60R 2300/205* (2013.01); *B60R 2300/301* (2013.01); *B60R 2300/806* (2013.01); *B60W 30/14* (2013.01); *B60W 2050/146* (2013.01); *G01C 21/26* (2013.01); *G05D 1/0088* (2013.01); *G05D 2201/0212* (2013.01); *G08G 1/16* (2013.01); *G09G 2380/10* (2013.01)

(56) References Cited

U.S. PATENT DOCUMENTS

| | | | |
|---|---|---|---|
| 8,626,434 B1* | 1/2014 | Kornmann | G01C 21/3638 345/625 |
| 2009/0112452 A1* | 4/2009 | Buck | G08G 1/096716 701/117 |
| 2012/0173069 A1 | 7/2012 | Tsimhoni et al. | |
| 2014/0297181 A1* | 10/2014 | Kondo | G01C 21/3658 701/532 |
| 2015/0032290 A1 | 1/2015 | Kitahama et al. | |
| 2016/0129836 A1* | 5/2016 | Sugita | B60K 35/00 701/41 |

FOREIGN PATENT DOCUMENTS

| | | |
|---|---|---|
| JP | 2006-190237 A | 7/2006 |
| JP | 2006-284458 A | 10/2006 |
| JP | 2007-272350 A | 10/2007 |
| JP | 2010-198578 A | 9/2010 |
| JP | 2012-176748 A | 9/2012 |
| WO | 2006/064544 A1 | 6/2006 |
| WO | 2015141308 A1 | 9/2015 |

* cited by examiner

VEHICLE IMAGE DISPLAY SYSTEM AND METHOD

RELATED APPLICATIONS

The present application is National Phase of International Application No. PCT/JP2016/057551 filed Mar. 10, 2016, and claims priority from Japanese Application No. 2015-064298, filed Mar. 26, 2015, the disclosure of which is hereby incorporated by reference herein in its entirety.

TECHNICAL FIELD

The present invention relates to a vehicle image display system and method used for automated driving for a vehicle, in particular, such as an automobile.

BACKGROUND ART

Recently, to further improve road traffic safety, there have been developed and proposed a variety of technologies for automated driving of a vehicle such as an automobile without manual operation of a driver. In general, during automated driving, an own vehicle automatically travels on a road in accordance with a travel route to a previously-set destination while detecting a position of the own vehicle on a road map. At that time, the travel route and the own vehicle position are displayed in real time on a monitor screen of a mounted navigation system.

Here, in a case, for example, that behaviors of the own vehicle and surrounding vehicles cannot be recognized in advance during traveling with automated driving, there may be a fear that an occupant is annoyed with uneasiness or unpleasantness. To eliminate such uneasiness or the like, there has been proposed an automated travelling vehicle that includes means to inform an occupant of a behavior to be subsequently performed by an own vehicle during automated driving in accordance with a previously-set travel plan and a behavior of another vehicle existing therearound obtained through vehicle-to-vehicle communication and the like (e.g., see Patent Literature 1).

Further, there has been known a travel state display apparatus, for an automated driving vehicle capable of switching between automated driving of a vehicle and manual driving by a driver, that displays on a screen a travel state with automated driving control for helping an occupant be ready and prepared in advance for switching to manual driving (e.g., see Patent Literature 2). In this apparatus, stability of automated driving control is displayed by an image resembling a steering wheel. Here, inclination and display area of the steering wheel are configured to be varied in accordance with a state of an own vehicle and environment information therearound.

Further, a parking support apparatus and an automated driving control system have been put to practical use for parking into a garage or parallel parking. An automated parking apparatus of the above calculates a shortest route that prevents contact with an obstacle existing between an own vehicle and a parking space and displays the route as being superimposed to an actually-taken image (e.g., see Patent Literature 3). After a driver checks the above and performs correction if required, parking with automated driving is started.

CITED LITERATURE

Patent Literature

Patent Literature 1: Japanese Patent Application Laid-Open No. H10-105885

Patent Literature 2: Japanese Patent Application Laid-Open No. 2001-199295

Patent Literature 3: International Patent Application Laid-open No. WO2006/064544

SUMMARY OF THE INVENTION

According to the automated driving vehicle disclosed in Patent Literature 1, on a screen of a display portion, the vehicle is displayed as a mark having a rectangle added to a base of an isosceles triangle that indicates a travel direction thereof and a direction of lane change is displayed as a curved arrow in a simulated manner. With such simple marks, it is difficult to make an occupant recognize travel states of the own vehicle and other vehicles such as a travel speed and an inter-vehicle distance, and a specific route for lane change. Accordingly, there may be a fear that uneasiness of the occupant cannot be sufficiently released or reduced.

According to the drive state display apparatus disclosed in Patent Literature 2, stability of automated driving control is displayed as being indicated by inclination and display area of the image resembling the steering wheel. Specifically, the inclination of the steering wheel becomes large and the display area thereof becomes small decrease of switching possibility to manual driving with excellent stability. In contrast, the inclination of the steering wheel becomes small and the display area thereof becomes large with increase of the switching possibility to manual driving with insufficient stability. However, with such image displaying, it is difficult for an occupant to specifically and intuitively recognize or imagine travel state of an own vehicle that requires switching to manual driving. Accordingly, especially in a case of emergency, there may be a fear that decision or response of the occupant is delayed or insufficient.

According to the apparatus for parking an automobile into a garage disclosed in Patent Literature 3, an own vehicle, obstacles, and a parking space based on position data obtained through a GPS device, a variety of sensors, and the like, and a calculated candidate route for parking into a garage can be displayed as being superimposed to an actual image taken by a vehicle-mounted camera. Here, the obstacles and the parking space are displayed graphics each indicating an outline and area thereof. Further, the candidate route is displayed by a polygonal curve connecting a plurality of points. Accordingly, it is difficult for a driver to sufficiently recognize how the own vehicle moves to the parking space while avoiding the obstacles. Furthermore, in a case of parking at a first-time or unfamiliar parking space, it is extremely difficult to imagine whether the parking space is sufficiently large with respect to the own vehicle and how the own vehicle parks.

In order to solve the abovementioned problems in related art, an object of the present invention is to provide a vehicle image display system and a method thereof with which, during automated driving, a travel behavior of an own vehicle to be subsequently performed is previously noticed to a driver and another occupant with image displaying in a manner of being easy to be recognized promptly, intuitively, and specifically.

A vehicle image display system of the present invention to be used for an automated driving system that causes an own vehicle to travel with automated driving along a previously-set scheduled travel route to a destination in accordance with a scheduled travel behavior, includes a display device mounted on the own vehicle configured to display prior notice on a display screen as a picture image visually indicating an unscheduled travel behavior in advance when the automated driving system is trying to cause the own vehicle to perform the unscheduled travel behavior that is different from the scheduled travel behavior, and a display control unit configured to control displaying of the picture image at the display device based on input from the automated driving system.

Owing to that an unscheduled travel behavior of the own vehicle to be subsequently performed is previously noticed with displaying on a screen of the display device as a visual picture image, the travel behavior can be recognized promptly, intuitively, and specifically by an occupant of the own vehicle.

In another embodiment, the picture image includes a moving image of the own vehicle virtually travelling on the display screen of the display device in accordance with the unscheduled travel behavior. Accordingly, the unscheduled travel behavior of the own vehicle to be subsequently performed can be recognized by an occupant more intuitively.

In another embodiment, the picture image includes a graphic symbol indicating, on the display screen of the display device, a travel course of the own vehicle scheduled in accordance with the unscheduled travel behavior. Accordingly, the unscheduled route of the subsequent movement of the own vehicle can be recognized by an occupant more specifically and correctly.

In another embodiment, the unscheduled travel behavior is defined as travelling on an unscheduled travel course as being deviated from a scheduled travel course on a road previously set along the travel route by the automated driving system.

In another embodiment, the unscheduled travel behavior is defined as performing parking/stopping as being deviated from a scheduled travel course on a road previously set along the travel route by the automated driving system.

In another embodiment, the unscheduled travel behavior is defined as making a U-turn as being deviated from a scheduled travel course on a road previously set along the travel route by the automated driving system.

In another embodiment, the display device includes a head-up display device that uses a front windshield of the own vehicle for displaying the picture image. Accordingly, an occupant of the own vehicle can recognize more specifically the unscheduled travel behavior of the own vehicle to be subsequently performed while viewing an actual travel state as having actual scenery through a front wind shield as a background.

In another embodiment, the display device includes a monitor device mounted on a dashboard of the own vehicle. Here, modifications and image processing that are difficult to be performed on actual scenery serving as a background image, and a variety of image displaying other than the abovementioned picture images can be displayed as being added to roads of taken images and virtual images displayed on the monitor device. Accordingly, it is possible to provide more information to an occupant with respect to the unscheduled travel behavior of the own vehicle to be subsequently performed.

According to another aspect of the present invention, a vehicle image display method of the present invention, used for an automated driving system that causes an own vehicle to travel with automated driving along a previously-set scheduled travel course to a destination, includes generating a picture image visually indicating an unscheduled travel behavior in advance when the automated driving system is trying to cause the own vehicle to perform the unscheduled travel behavior that is different from a scheduled travel behavior, and displaying the picture image as prior notice on a display screen of a display device mounted on the own vehicle.

Owing to that an unscheduled travel behavior of the own vehicle to be subsequently performed is previously noticed with displaying on a screen of the display device as a visual picture image, the travel behavior can be recognized promptly, intuitively, and specifically by an occupant of the own vehicle.

In another embodiment, the picture image includes a moving image of the own vehicle virtually travelling on the display screen of the display device in accordance with the unscheduled travel behavior. Accordingly, the unscheduled travel behavior of the own vehicle to be subsequently performed can be recognized by an occupant more intuitively.

In another embodiment, the picture image includes a graphic symbol indicating, on the display screen of the display device, a travel course of the own vehicle scheduled in accordance with the unscheduled travel behavior. Accordingly, the unscheduled route of the subsequent movement of the own vehicle can be recognized by an occupant more specifically and correctly.

In another embodiment, the unscheduled travel behavior is defined as travelling on an unscheduled travel course as being deviated from a scheduled travel course on a road previously set along the travel route by the automated driving system.

In another embodiment, the unscheduled travel behavior is defined as performing parking/stopping as being deviated from a scheduled travel course on a road previously set along the travel route by the automated driving system.

In another embodiment, the unscheduled travel behavior is defined as making a U-turn as being deviated from a scheduled travel course on a road previously set along the travel route by the automated driving system.

In another embodiment, the display device uses a front windshield of the own vehicle for prior notice displaying with picture images. Accordingly, an occupant of the own vehicle can recognize more specifically the unscheduled travel behavior of the own vehicle to be subsequently performed while viewing an actual travel state as having actual scenery through a front wind shield as a background.

In another embodiment, the display device uses a monitor device mounted on a dashboard of the own vehicle for prior notice displaying with picture images. Here, modifications and image processing that are difficult to be performed on actual scenery serving as a background image, and a variety of image displaying other than the abovementioned picture images can be displayed as being added to roads of taken images and virtual images displayed on the monitor device. Accordingly, it is possible to provide more information to an occupant in relation to the unscheduled travel behavior of the own vehicle to be subsequently performed.

EMBODIMENTS OF THE INVENTION

In Japan, automation degree of automated driving systems for vehicles such as automobiles is defined as being classified into four levels, from Level 1 to Level 4. Level 1 is called a safe driving assisting system with which any of accelerating, steering, and braking is performed by an automobile. Level 2 is called a quasi-automated-driving system with which a plurality of operations among accelerating, steering, and braking is performed by an automobile. Level 3 is also called a quasi-automated-driving system with which all of accelerating, steering, and braking are performed by an automobile while those are performed by a driver only in a case of emergency. Level 4 is called a completely automated driving system with which all of accelerating, steering, and braking are performed something other than a driver completely without involvement of the driver. Here, an automated driving system represents Level 2 through Level 4 ("strategic innovation program (SIP) automated driving system research and development plan", Nov. 13, 2014, Cabinet Office, Director-General for Policy Planning, Science Technology and Innovation Department). With reference to the above, in the present specification, automated driving is defined basically to include automated driving at all automation degrees, Level 1 to Level 4, unless otherwise specified.

In the following, preferable embodiments of an image display system of the present invention will be described in detail with reference to the attached drawings. Automated driving in the following embodiments represents automated driving of Level 3. Further, in the attached drawings, the same or similar reference is given to the same or similar structural component.

Figure 1:
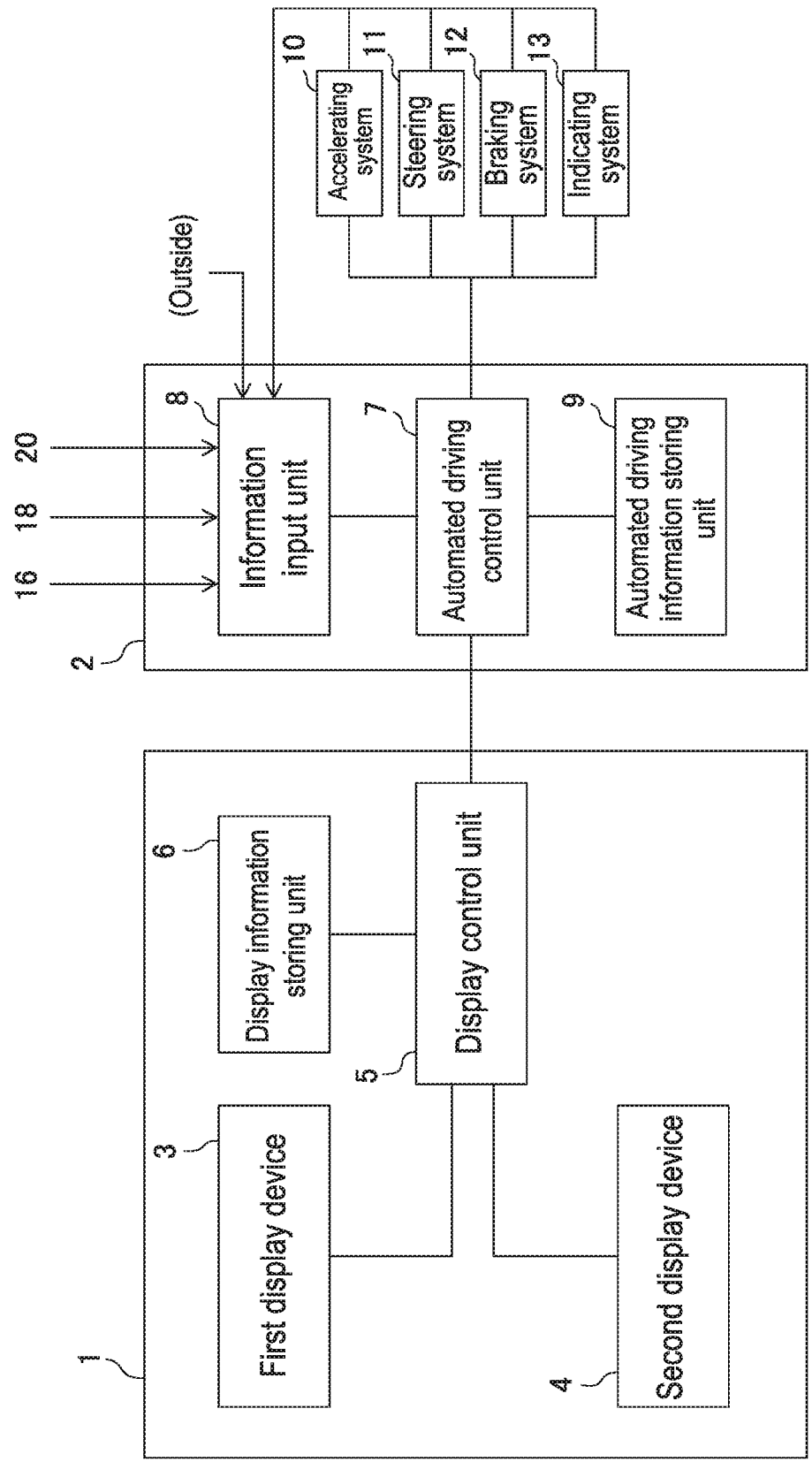
FIG. 1 is a block diagram illustrating an entire configuration of a vehicle image display system according to a preferable embodiment of the present invention.

FIG. 1 schematically illustrates an entire structure of a vehicle image display system 1 for an automobile of the present embodiment and an automated driving system 2 to be used in combination therewith. The vehicle image display system 1 includes a first display device 3 that uses a front windshield of an automobile as a display screen, a second display device 4 being a monitor device mounted on or in a dashboard of the automobile, a display control unit 5, and a display information storing unit 6.

The automated driving system 2 includes an automated driving control unit 7, an information input unit 8, and an automated driving information storing unit 9. The automated driving control unit 7 is connected to an accelerating system 10, a steering system 11, a braking system 12, and an indicating system 13 of the automobile as well as the display control unit 5 of the vehicle image display system 1. Further, the automated driving control unit 7 is connected to an unillustrated fuel system and an unillustrated electric system such as a battery.

In general, the accelerating system 10 performs a function to start moving of an automobile as increasing revolution of an engine and shifting gears and to increase or maintain speed of the automobile. The steering system 11 performs a function to operate a steering wheel of an automobile. The braking system 12 performs a function to decrease speed or stop moving of an automobile as decreasing revolution of an engine and shifting gears. The indicating system 13 performs a function to turn on or turn off direction indicators, parking lamps, hazard flashers, head lamps, tail lamps, backing lamps, and the like.

To obtain own vehicle information such as a position, a travel state, and the like of an own vehicle, the information input unit 8 is connected with various kinds of sensors, communication equipment for communication with the outside, and the like mounted on an own vehicle. For example, to accurately ascertain a position of the own vehicle, the information input unit 8 can receive, from a global positioning system (GPS), signals and image data transmitted from a satellite orbiting the earth or receive information through road-to-vehicle communication with an antenna or a communication chip mounted on a road.

Further, the information input unit 8 can obtain information regarding a travel state of the own vehicle from a shift position sensor arranged at the steering system 11 of the own vehicle, a brake sensor arranged at the braking system 12, a speed sensor arranged at wheels, and the like. Further, the information input unit 8 can receive input directly or indirectly from a driver or another occupant.

Further, to obtain information regarding traffic situations around the own vehicle, the information input unit 8 is connected with cameras, various kinds of sensors, communication equipment for communication with the outside, and the like mounted on the own vehicle. For example, the information input unit 8 can obtain information of a position, a route, and a travel state of another vehicle through vehicle-to-vehicle communication with the other vehicle traveling, parking, or stopping around the own vehicle and/or can obtain latest traffic information regarding travel situations of other vehicles, road situations, and the like through radio communication with a traffic information center via the internet or public broadcasting.

Figure 2:
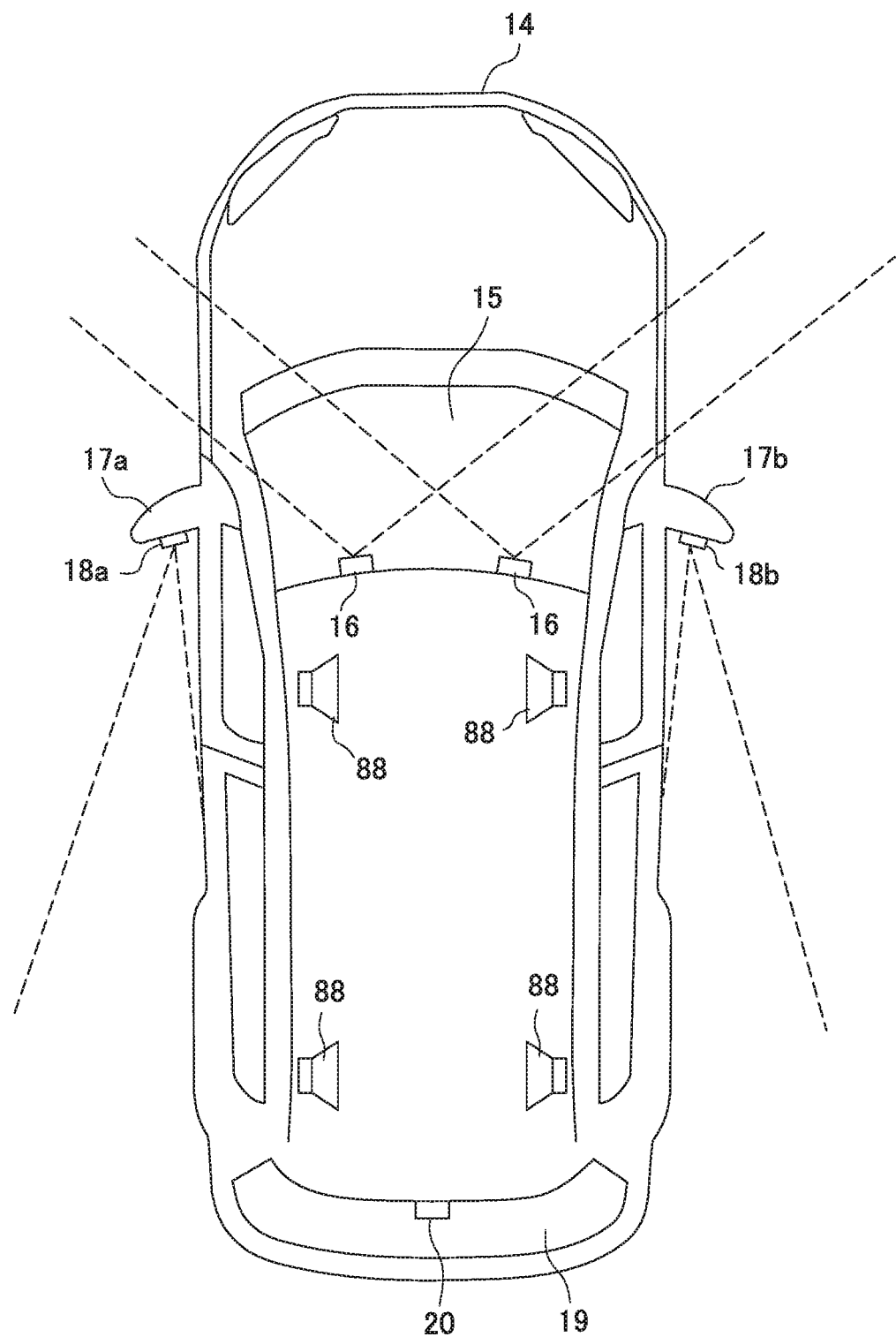
FIG. 2 is a plane view illustrating an example of an automobile on which cameras and sensors are mounted.

As illustrated in FIG. 2, it is possible to arrange a right-left pair of front cameras 16, 16 at a front windshield 15 to recognize a target at each of the center, right, and left in front of an automobile 14, and to arrange a right-left pair of rear cameras 18a, 18b at lower sections of right-left door mirrors 17a, 17b to recognize a target at the lateral rear. In another embodiment, it is also possible to arrange an all-direction camera system by adding another camera to the cameras described above.

Further, as illustrated in FIG. 2, to perform detection straight behind the automobile 14, a radar sensor 20, for example, being a millimeter-wave radar sensor, a micrometer radar sensor, a laser radar sensor, an infrared radiation sensor, an ultrasonic sensor, or the like is arranged at the center of an upper section of a rear windshield 19. Further, to support detection at night or in rough weather such as dense fog and heavy rain, a radar sensor similar to the above may be arranged at a front center (e.g., at a radiator frame or under a hood) of the automobile 14. In another embodiment, a center rear camera may be attached at the rear center of the automobile 14 instead of or in addition to the radar sensor 20.

Road map information is stored in advance in the automated driving information storing unit 9, the road map information being necessary for selecting a travel route to a destination or changing the travel route if required and being necessary for travelling with automated driving along the determined travel route, such as road maps, lane information, and traffic rules such as regulation speeds and traffic signs. Further, a reference data file including data of images or shape features of various targets may be stored in the automated driving information storing unit 9, the reference data file being used for detecting and recognizing, as targets, vehicles such as automobiles and pedestrians existing around the own vehicle from the information obtained by the information input unit 8.

The automated driving control unit 7 is structured with a microcomputer that includes a CPU, a ROM, and a RAM. The CPU executes a program stored in the ROM for performing automated driving of an automobile. When a destination is input by a driver or another occupant before starting automated driving, the automated driving control unit 7 computes a travel route to the destination and proposes one or more candidates of the travel route. When an occupant confirms or selects one of the proposed travel routes, the automated driving control unit 7 controls the accelerating system 10, the steering system 11, the braking system 12, and the indicating system 13 in accordance with the travel route so that automated driving is started. Here, the automated driving control unit 7 performs switching between an automated driving mode and a manual driving mode in accordance with switching operation performed by an occupant.

In the vehicle image display system 1 of the present embodiment, image displaying on the first display device 3 and the second display device 4 is controlled by the display control unit 5. Based on instructions and information received from the automated driving control unit 7 of the automated driving system 2, the display control unit 5 causes the first display device 3 and/or the second display device 4 to display necessary images. The display information storing unit 6 previously memorizes data files of various display patterns of images that indicate a behavior during automated driving or a previously noticed behavior of an own vehicle and programs of displaying thereof.

Figure 3:
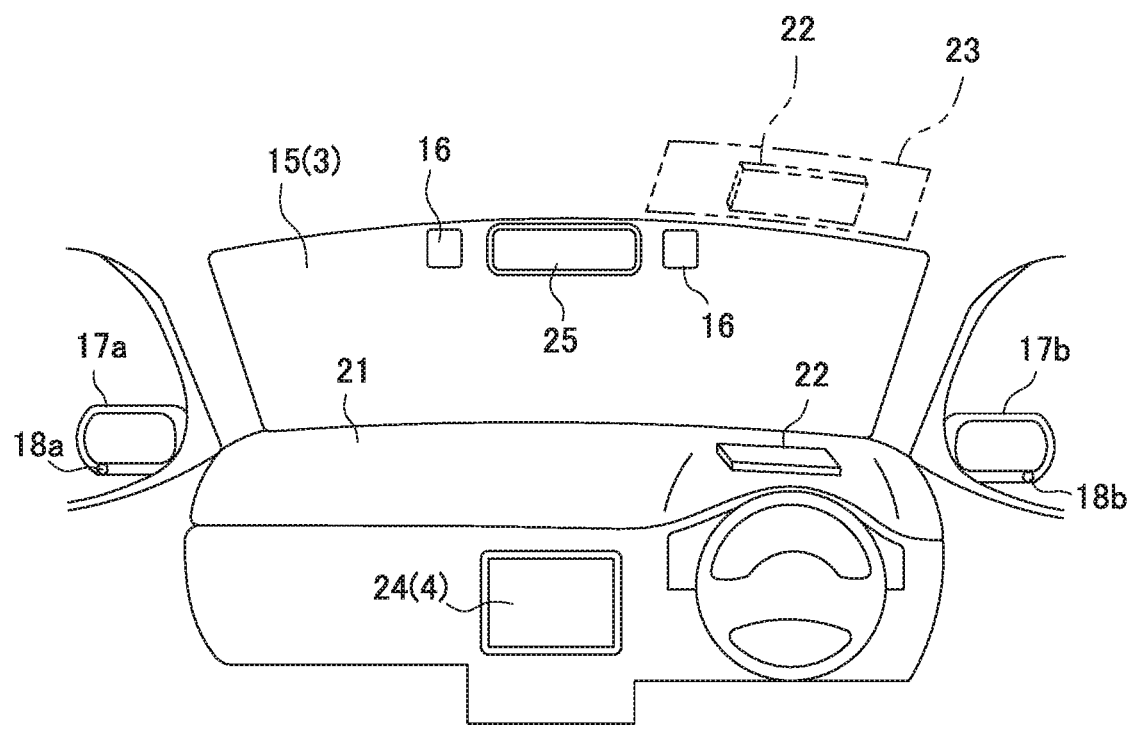
FIG. 3 is a schematic view viewing, from a driver's seat side, a front windshield and an upper part of a dashboard of the automobile on which the vehicle image display system of the present invention is mounted.

FIG. 3 schematically illustrates, as viewing from a driver's seat side, the front windshield 15 and an upper section of a dashboard 21 of an automobile on which the vehicle image display system 1 is mounted. A head-up display (HUD) device 22 is arranged at the upper section of the dash board 21 as the first display device 3 to project an image onto the front windshield 15. The HUD device 22 can be assembled in the dashboard 21. Alternatively, the HUD device may be arranged on an upper face of the dashboard 21 or at a position of a sun visor 23 at a ceiling of a driver's seat. Further, the HUD device may be arranged so that the projecting can be performed from a plurality of positions of the above and/or others.

In general, HUD devices having a variety of structures are developed and used, such as a type in which a front windshield functions as a screen and a type in which a display image is projected onto a transparent screen arranged between a front windshield and eyes of an occupant or arranged on a surface of a front windshield. An HUD device of the present invention may have any structure and any configuration that have been known.

A monitor device 24 as the second display device 4 is integrally assembled in the dashboard 21 (i.e., in-dash) approximately at the front center of the dashboard 21. The monitor device may be attached on the dashboard 21 (i.e., on-dash). Further, a rearview mirror 25 is attached at the center upper section of the front windshield 15. As described later, it is possible to cause the rearview mirror 25 to function as a third display device of the vehicle image display system 1.

Figure 4A:
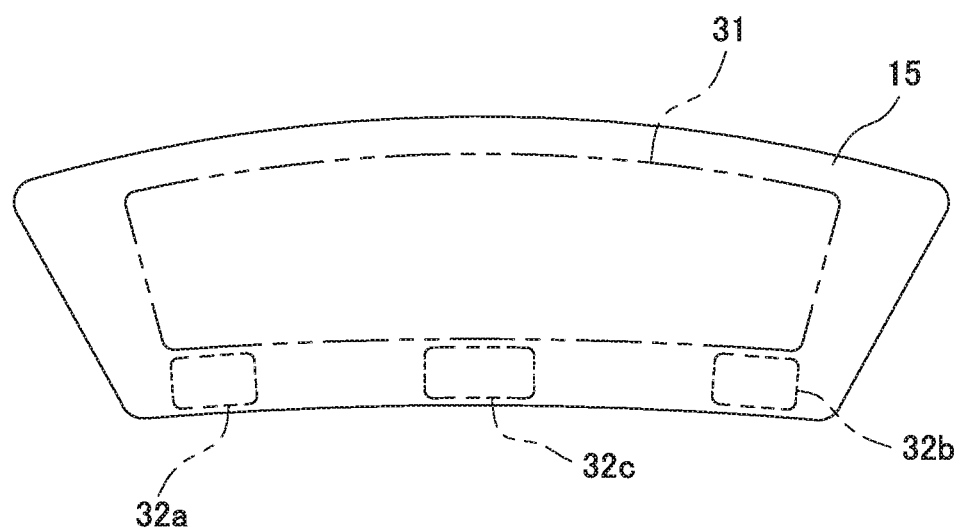
FIGS. 4A and 4B are explanatory views each illustrating a display area of the front windshield viewing from the driver's seat side.

The front windshield 15 may be divided into several display areas to use the entire surface or a part thereof as the first display device 3. For example, as illustrated in FIG. 4A, a main display area 31 is defined as a wide view area including a center section of the front windshield 15 to project an image that is superimposed to actual scenery viewed through the front windshield 15. As described later, the main display area 31 is used for displaying an image indicating a scheduled travel course on a road during travelling of the automobile 14 with automated driving and an image providing prior notice of an unscheduled travel behavior such as travelling of the automobile 14 as deviating from a scheduled travel course, for example, for lane change.

Auxiliary display areas 32b, 32a, 32c are arranged at the right, left, and center below the main display area 31 along a lower edge side of the front windshield 15. The right-left auxiliary display areas 32b, 32a may be used for projecting rear view pictures taken by the right-left rear cameras 18b, 18a or processed images thereof. The center auxiliary display area 32c may be used for projecting a processed image of a target detected by the radar sensor 20 at the rear of the automobile 14, a picture taken by the center rear camera arranged in place of the radar sensor, or a processed image thereof.

Figure 4B:
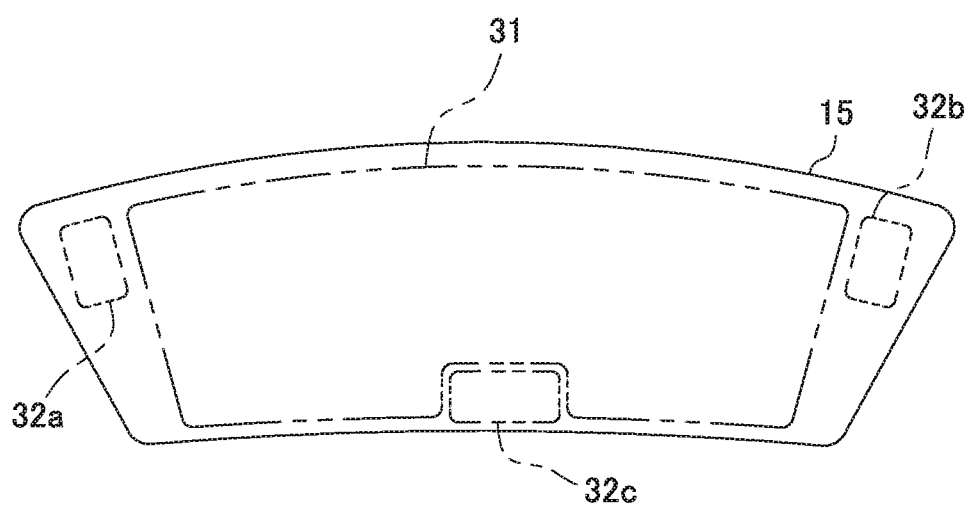

In another example, as illustrated in FIG. 4B, the right-left auxiliary display areas 32b, 32a are arranged at upper sections along right-left sides of the front windshield 15, respectively. According to the above, it is possible to ensure the main display area 31 that is larger than that in the case of FIG. 4A.

Both arrangements illustrated in FIG. 4A and FIG. 4B are preferable to be applied in a case that a hood of an own vehicle is invisible through the front windshield 15. In contrast, FIG. 5 exemplifies a case that a front section of the hood 33 of an own vehicle is visible through the front windshield 15. In this case, as illustrated in FIG. 5, the right, left, and center display areas 32b, 32a, 32c are arranged in a range through which roads and surroundings thereof in actual scenery in invisible, that is, a range through which the hood 33 is visible.

In another example, the rearview mirror 25 may be used as the third display device of the vehicle image display system 1 to display an image from the radar sensor 20 or the center rear camera thereon. In this case, since the center auxiliary display area 32c can be eliminated, it is possible to enlarge the main display area 31 by the amount thereof or to enlarge the view area of the front windshield 15 that is not used as the first display device 3.

Figure 5:
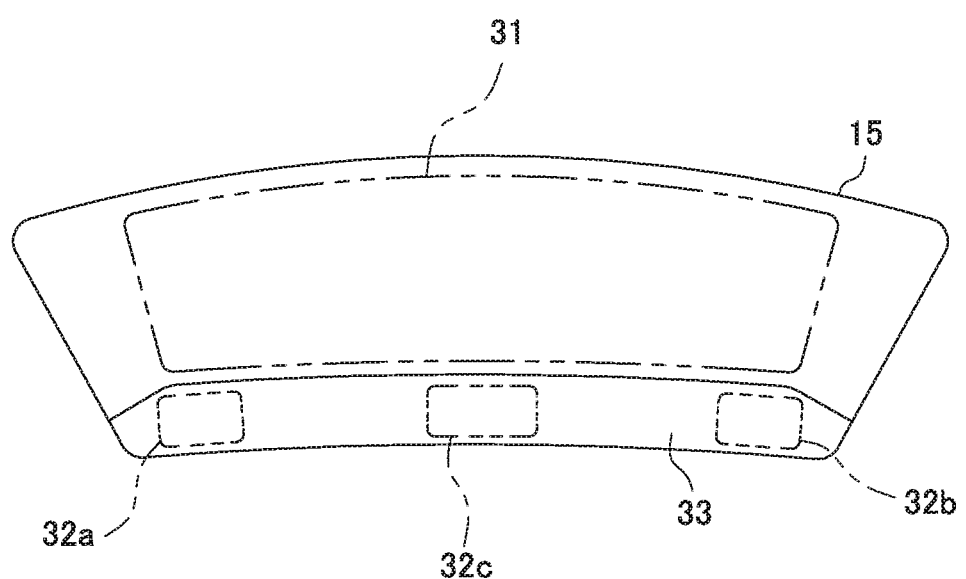
FIG. 5 is an explanatory view of the front windshield illustrating a modified example of FIG. 4A.

Naturally, arrangement of the display areas of the first display device 3 at the front windshield 15 is not limited to examples illustrated in FIGS. 4A, 4B, and 5. Sizes, shapes, and locations of the auxiliary display areas may be set variously in accordance with contents, sizes, forms, positions, and the like of images to be displayed.

Figure 6A:
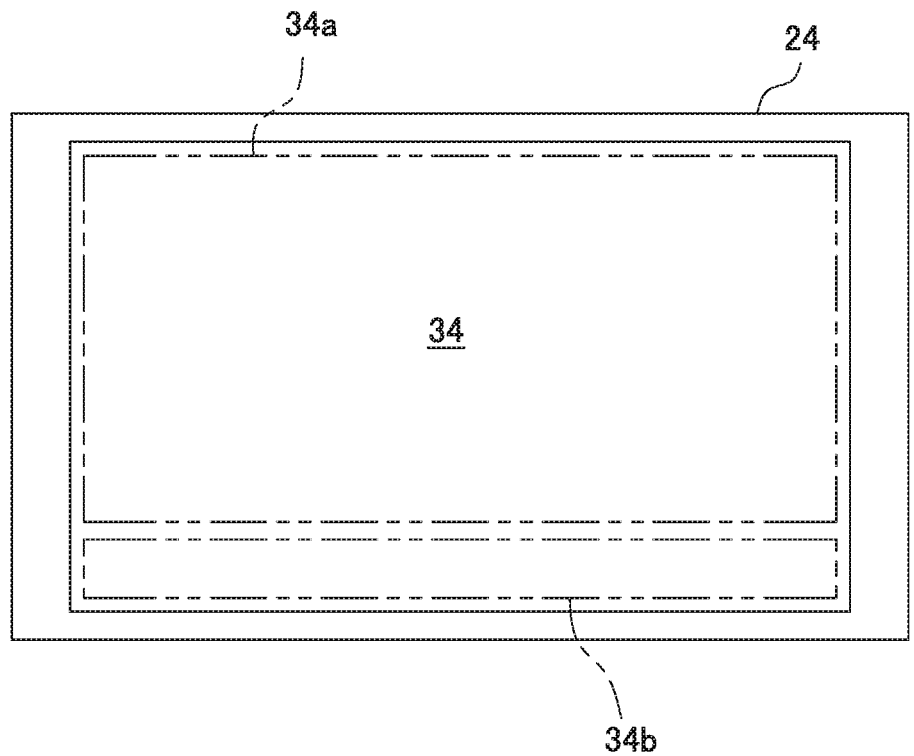
FIGS. 6A and 6B are explanatory views each illustrating an enlarged display screen of a monitor device.
Figure 6B:
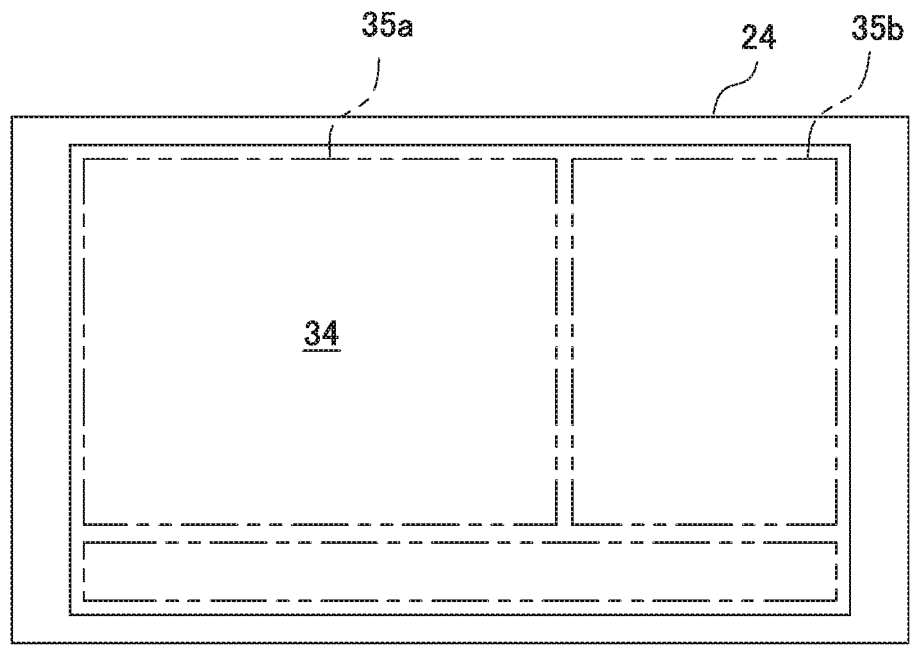

FIGS. 6A and 6B illustrate a display screen 34 of the monitor device 24 in an enlarged manner. The monitor device 24 is used normally as a display device of a car navigation system mounted on the automobile 14. In this case, as illustrated in FIG. 6A, the display screen 34 is occupied substantially entirely by an information display area 34a that displays map data including a variety of road information for performing route guidance of a current position and to a destination during travelling. A touch-panel type operational area 34b may be arranged along a lower edge side thereof.

However, the display screen 34 of the monitor device 24 is not limited to the screen with areas divided as illustrated in FIG. 6A. For example, it is possible to define the entire display screen 34 as one display area with the operational area 34b eliminated and to appropriately arrange touch-panel type operational buttons therein.

FIG. 6B exemplifies a configuration of the display screen 34 in a case that the monitor device 24 is used as the second display device 4. The display screen 34 in FIG. 6B is divided into two areas being a behavior display area 35a, similarly to the main display area 31 of the first display device 3, for displaying an image indicating a scheduled travel course on a road during travelling with automated driving and an image providing prior notice of an unscheduled travel behavior such as deviating from a scheduled travel course on a road and a navigation display area 35b for displaying map data as the display device of the car navigation system.

In FIG. 6B, the navigation display area 35b is set to minimum area required for displaying map data while the behavior display area 35a is set large. The touch-panel type operational area 34b remains below the behavior display area 35a and the navigation display area 35b. In another example, it is possible to appropriately arrange touch-panel type operational buttons in the behavior display area 35a and/or the navigation display area 35b with the operational area 34b eliminated as described above.

Here, the screen configuration of the behavior display area 35a and the navigation display area 35b is not limited to divided arrangement illustrated in FIG. 6B. These display areas may be enlarged or lessened as required to vary shapes and/or locations thereof. Further, it is also possible to define another display area (e.g., for displaying road information other than maps) as required.

Further, it is possible to display, on the display screen 34, rear view images corresponding to the right, left, and center auxiliary display areas 32b, 32a, 32c of the front windshield 15 as required. Such rear view images are not necessarily required to be continuously displayed. It is preferable to display the rear view images on a temporary basis as required at the convenience of the size of the display screen 34.

Displaying on the display screen 34 of the monitor device 24 can be performed while the screen configuration thereof is switched between the configurations of FIGS. 6A and 6B. For example, displaying may be performed continuously with the screen configuration of FIG. 6B during travelling with automated driving and continuously with the screen configuration of FIG. 6A during travelling with manual driving. Naturally, it is also possible to perform displaying while switching the screen configurations of FIGS. 6A and 6B automatically or manually as required during automated driving and/or manual driving.

Figure 7A:
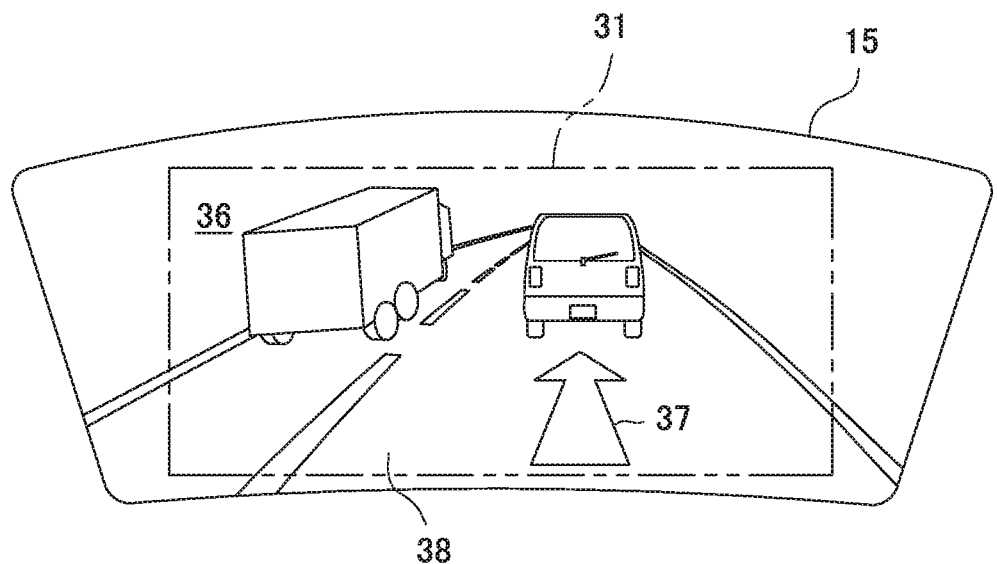
FIGS. 7A and 7B are schematic views illustrating normal screen displaying of the first and second display devices during automated driving.
Figure 7B:
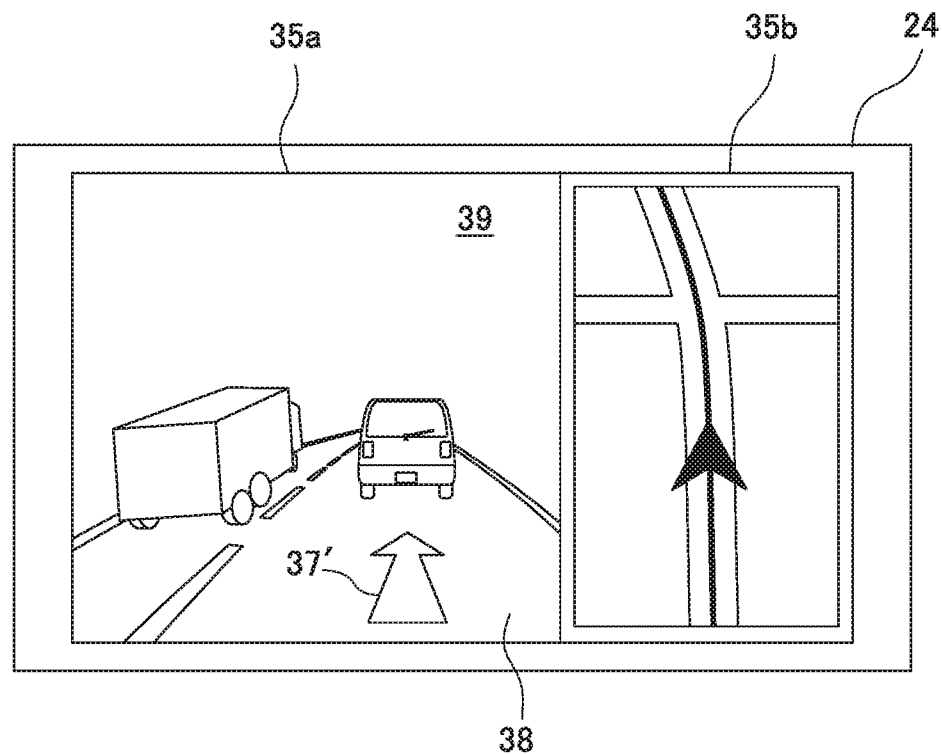

FIGS. 7A and 7B illustrate an example of normal screen displaying to be displayed at the first and second display devices 3, 4 respectively during travelling with automated driving. Automated driving of the automobile 14 is performed as follows, for example. However, it is not limited thereto.

First, based on a destination previously input by an occupant, current position information of the own vehicle obtained from the information input unit 8, map data to the destination stored in the automated driving information storing unit 9, and road traffic information and the like obtained through the information input unit 8 at the time when the destination is input, the automated driving control unit 7 computes one or more candidates of a travel route to the destination and proposes the candidates to the occupant. The travel route determined with confirmation or approval of the occupant is stored in the automated driving information storing unit 9 as a scheduled travel route. In accordance with an instruction of the occupant to start automated driving, the automated driving control unit 7 controls the accelerating system 10, the steering system 11, the braking system 12, and the indicating system 13 and causes the own vehicle to travel with automated driving along the scheduled travel route. Here, the scheduled travel route represents a route to the previously-set destination.

For example, as illustrated in FIG. 7A, the first display device 3 displays a symbol image 37 that indicates a travel course of the own vehicle as superimposing the symbol image 37 to a road in actual scenery 36 viewed through the front wind shield 15. Here, the travel course represents a course for the own vehicle to actually travel on a lane of a road with steering thereof controlled. The symbol image 37 is generated by that the display control unit 5 to which travel information of the own vehicle is input from the automated driving control unit 7 of the automated driving system 2 processes image data obtained from the display information storing portion 6, and then, is projected to the main display area 31 on the front windshield 15 by the HUD device 22.

The travel information obtained from the automated driving control unit 7 may include, for example, route information such as maps of a current position of the own vehicle and the vicinity thereof, road information, and traffic lanes, a travel speed of the own vehicle, a steering angle, and the like. According to the above, the symbol image 37 can be projected as being appropriately positioned with respect to an overtaking lane 38 in the actual scenery 36. In particular, it is preferable that an eye position of an occupant at the driver's seat is previously confirmed by the automated driving control unit 7 or the HUD device 22, so that the symbol image 37 can be displayed more accurately with respect to the actual scenery 36.

For example, as illustrated in FIG. 7B, the second display device 4 displays, in real time, a moving image of scenery 39 in front of the own vehicle taken by the front cameras 16, 16 at the behavior display area 35a of the monitor device 24. A symbol image 37' of the travel course of the own vehicle is displayed as being superimposed to an overtaking lane 38' of the taken scenery 39. Since a lane location in front of the travelling own vehicle can be recognized at high accuracy with the front cameras 16, 16, it is relatively easy to perform accurate positioning of the symbol image 37' with respect to the taken scenery 39 projected to the behavior display area 35a.

The monitor device 24 displays, at the navigation display area 35b, navigation information normally displayed by the car navigation system being a road map around the own vehicle, the scheduled travel route and the location of the own vehicle on the map, and the like. As described above, the behavior display area 35a or the navigation display area 35b may be displayed as being enlarged to the entire display screen 34, and then, may be returned into two-divided displaying.

Figure 8:
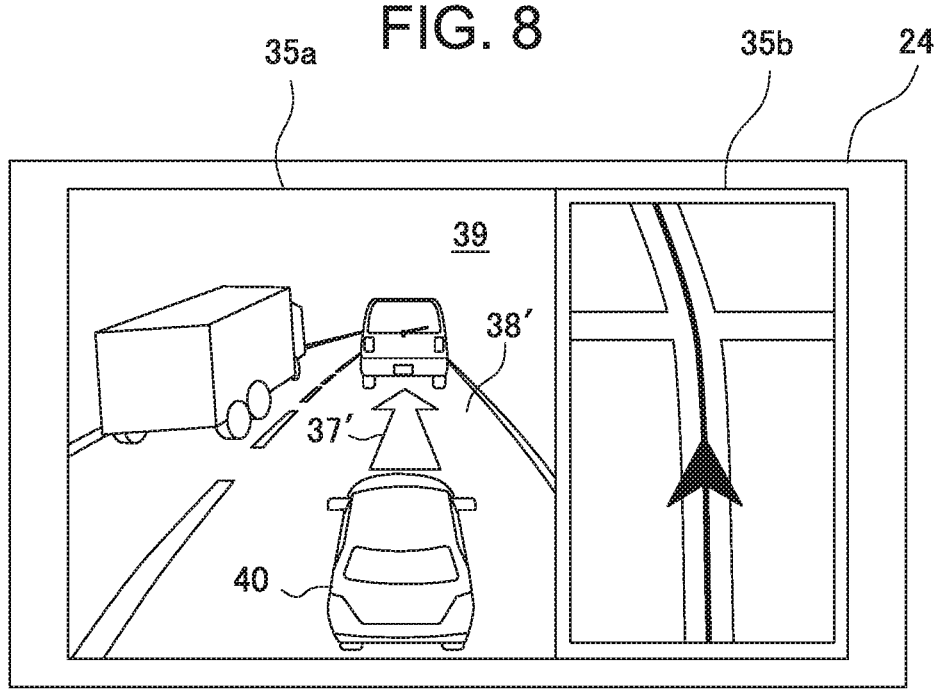
FIG. 8 is a schematic view illustrating a modified example of the normal screen displaying of the second display device.

FIG. 8 illustrates a modified example of the normal screen to be displayed at the behavior display area 35a of the monitor device 24. In this modified example, a picture image 40 indicating the travelling own vehicle is added to be displayed at the behavior display area 35a. The picture image 40 is an image obtained by imitating a shape of the entire own vehicle viewing slightly obliquely from the above on a road and is previously prepared and stored in the display information storing unit 6.

Owing to that the picture image 40 of the own vehicle is superimposed to the scenery 39 taken by the front cameras 16, 16 as described above, it is possible for the occupant to recognize, visually and more easily, situations (e.g., positional relation, orientation, and the like) of the own vehicle travelling on the road along the scheduled travel course on the relatively small display screen 34. Accordingly, in the case of FIG. 8, it is also possible to eliminate the symbol image 37' that indicates the travel course of the own vehicle.

Figure 9:
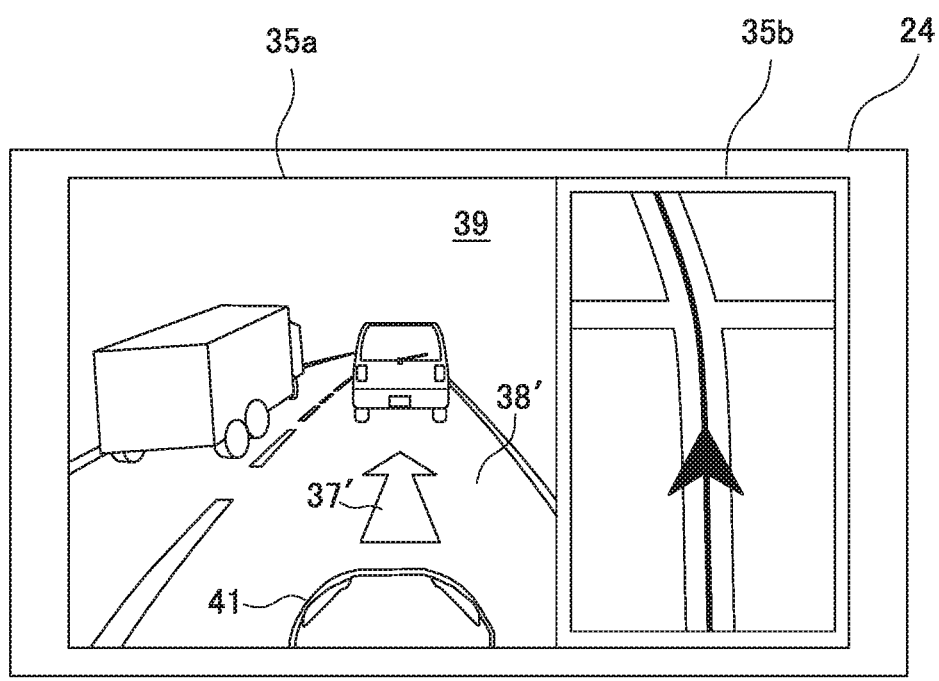
FIG. 9 is a schematic view illustrating another modified example of the normal screen displaying of the second display device.

FIG. 9 illustrates another modified example of FIG. 8. In this example, a picture image 41 to be added to be displayed at the behavior display area 35a includes only a portion of a vehicle body, that is, a front end portion of a hood viewing from a driver's seat side. According to the above, the taken scenery 39 to be displayed at the behavior display area 35a of the monitor device 24 can be displayed as an enlarged region. Similarly, the picture image 41 is previously prepared and stored in the display information storing unit 6. In this case as well, since the travel direction and the travel course of the own vehicle is easy to be recognized in a visual manner, the symbol image 37' may be eliminated.

In the examples of FIGS. 7A and 7B, each of the symbol images 37, 37' for the travel course is formed as an arrow mark consisting of an arrow-head portion and a stem portion. To cause the travel direction to be easy to be recognized at a glance, the stem portion is tapered from the own vehicle side to the front side and the arrow-head portion is tapered frontward as well in accordance therewith. In FIGS. 7A and 7B, since the travel course is straight, the symbol images 37, 37' are straight arrow marks. Naturally, when the travel course is curved, the arrow mark is to be curved in accordance therewith.

Figure 10A:
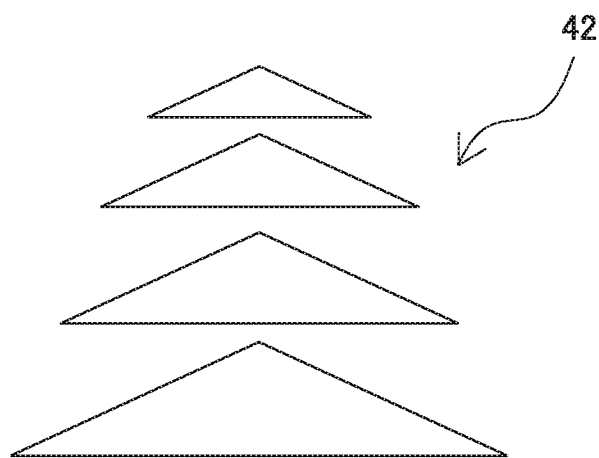
FIGS. 10A and 10B are views each illustrating a modified example of a symbol image of a travel course.
Figure 10B:
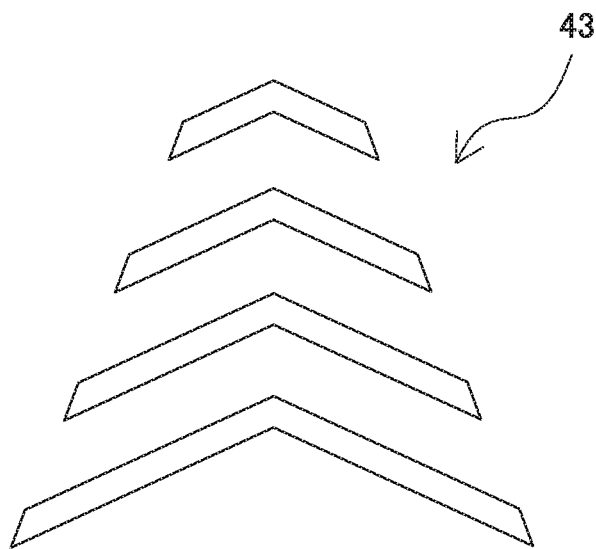

FIGS. 10A and 10B illustrate modified examples of the symbol marks 37, 37'. A symbol image 42 in FIG. 10A is formed by continuously arranging a plurality of similar triangles with dimensions thereof gradually decreasing toward the travel direction. Similarly, a symbol image 43 in FIG. 10B is formed by continuously arranging a plurality of similar arrow-head portions with dimensions thereof gradually decreasing toward the travel direction. Naturally, not limited to the images in FIGS. 10A and 10B, the symbol image 37 may be modified variously.

In every case that the symbol image 37, 37' of the travel course includes any of images in FIGS. 7, 10A, and 10B, it is preferable that the color thereof is distinctly different from colors that are normally used for traffic signs and the like on roads. In consideration of that the symbol images 37, 37' indicate normally scheduled travel course, it is preferable to adopt blue or green color series that may provide a relative sense of safety to an occupant.

In the following, description will be provided on screen displaying in a case that the automobile 14 is going to travel as being deviated from or out of the travel course of the symbol image 37 displayed in the normal screen displaying of the first and second display devices 3, 4 for some reason during travelling with automated driving in accordance with the scheduled travel route. Examples of such case includes cases to perform lane change from an overtaking lane to a cruising lane, or from a cruising lane to an overtaking lane or an opposing lane, to make a U-turn, to make parking/stopping at a road shoulder, and to make parking at a parking space with backward moving. Naturally, the present invention is not limited to such cases.

According to the present invention, before an automobile with automated driving performs a travel behavior to be deviated from or out of a normal scheduled travel course, the travel behavior about to be performed is previously noticed to a driver and another occupant in a manner of being easy to be recognized intuitively and instantaneously. In the present embodiment, the automated driving control unit 7 of the automated driving system 2 evaluates and determines, in accordance with previously-set programs stored in the automated driving information storing unit 9, whether the travel behavior being different from the scheduled travel behavior is to be performed and how the own vehicle behaves.

The evaluation and determination by the automated driving control unit 7 are performed based on a variety of information obtained through the information input unit 8 such as a current position and a travel state of the own vehicle, road situations therearound, situations of other vehicles or objects, and the like. The unscheduled travel behavior determined by the automated driving control unit 7 is performed unless the unscheduled travel behavior is cancelled by an occupant having viewed the prior notice displayed at the first and/or second display devices 3, 4 or switching is performed to manual driving.

Figure 11A:
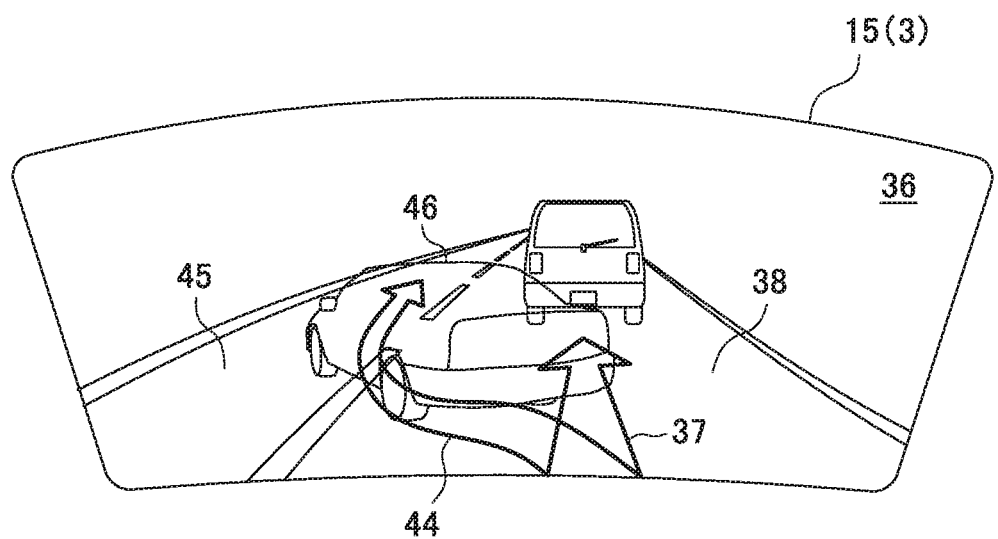
FIGS. 11A and 11B are schematic views each illustrating screen displaying in a case of performing lane change from an overtaking lane to a cruising lane.
Figure 11B:
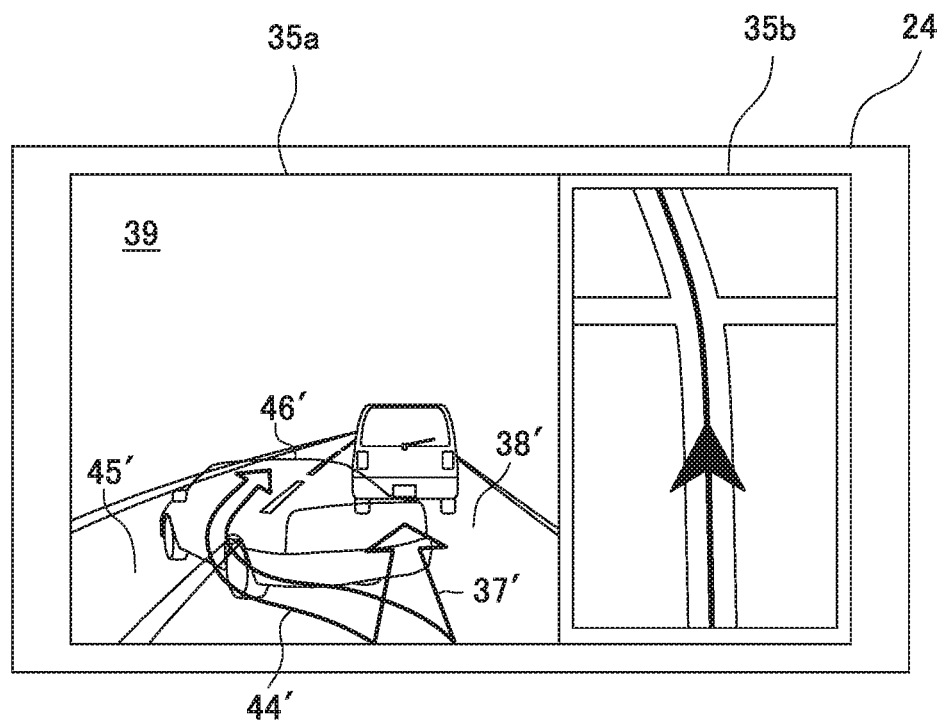

FIGS. 11A and 11B schematically illustrate screens for prior notice displayed respectively at the first and second display devices 3, 4 in advance in a case that the own vehicle with automated driving performs lane change from an overtaking lane to a cruising lane. A symbol image 44 indicating a travel course for the lane change is displayed at the first display device 3 in addition to the symbol image 37 indicating the scheduled travel course. Similarly, a symbol image 44' indicating the travel course for the lane change is displayed as well at the second display device 4 in addition to the symbol image 37' indicating the scheduled travel course. The symbol images 44, 44' may be displayed instead of the symbol images 37, 37'.

At the first display device 3, the symbol image 44 is formed as an arrow mark curved along a trajectory on which the own vehicle is previously noticed to travel with automated driving extending from a position on an overtaking lane 38 in the actual scenery 36 to a position on an adjacent cruising lane 45 being an aimed lane. At the second display device 4 as well, the symbol image 44' is formed as an arrow mark curved along a trajectory on which the own vehicle is previously noticed to travel with automated driving extending from a position on an overtaking lane 38' in the taken scenery 39 to a position on an adjacent cruising lane 45' being an aimed lane.

Similarly to the symbols 37, 37', each of these arrow marks consists of an arrow-head portion tapered frontward from the own vehicle side and a step portion tapered frontward in accordance therewith. The arrow of the symbol image 44, 44' and the arrow of the symbol image 37, 37' may be displayed with the ends thereof on the own vehicle side overlapped to each other as starting therefrom. According to the above, the occupant can recognize the travel course for the lane change more distinctly in an intuitive and specific manner with respect to the actual course on which the own vehicle is currently travelling.

Here, it is preferable that the arrow of the symbol image 44, 44' and the arrow of the symbol image 37, 37' are displayed in different colors to be distinctively recognizable. For example, yellow or orange color series may be adopted to call attention to prior notice of the behavior for lane change in contrast to the abovementioned blue or green color series for the symbols 37, 37'. Further, the symbol image 44, 44' can be further emphasized by displaying of that the entire thereof is brightened or a brightened portion moves frontward from the own vehicle side.

Further, at the first display device 3, a virtual vehicle of the own vehicle that performs lane change is displayed as a moving image of a virtual image 46. Similarly, at the second display device 4 as well, a virtual vehicle of the own vehicle that performs lane change is displayed as a moving image of a virtual image 46'. As described later, the virtual image 46, 46' is displayed so that the virtual vehicle of the own vehicle travels on the arrow of the symbol image 44, 44' indicating the travel course for lane change as having the arrow as the trajectory therefor.

Here, it is preferable that the virtual images 46, 46' are displayed, for example, as being entirely translucent in while or a light color to the extent that at least outline of the own vehicle is recognizable so as to prevent misrecognition and confusion with an actual vehicle for the occupant. According to the above, the lane change of the own vehicle to be performed can be expected by the occupant intuitively and specifically in a visual manner.

After determining to perform lane change from the overtaking lane 38 to the cruising lane 41, the automated driving control unit 7 of the automated driving system 2 instructs the display control unit 5 of the vehicle image display system 1 to display prior notice of the lane change. The display control unit 5 obtains, from the display information storing unit 6, image data necessary for displaying prior notice of the lane change. Then, the display control unit 5 performs necessary processes, so that the symbol images 44, 44' and the virtual images 46, 46' are generated and are transmitted to the first and second display devices 3, 4 to be displayed thereat.

Figure 12A:
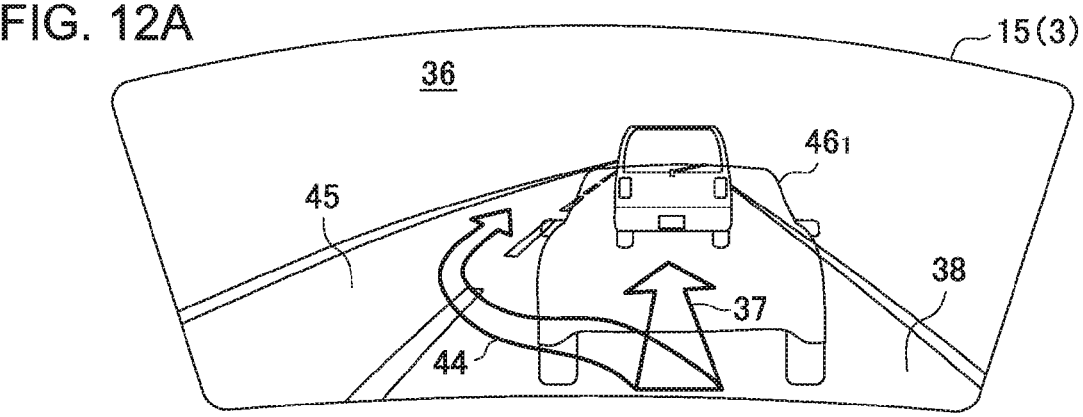
FIGS. 12A to 12D are schematic views illustrating lane change of a virtual vehicle displayed at the front windshield in the order of time passage.
Figure 12B:
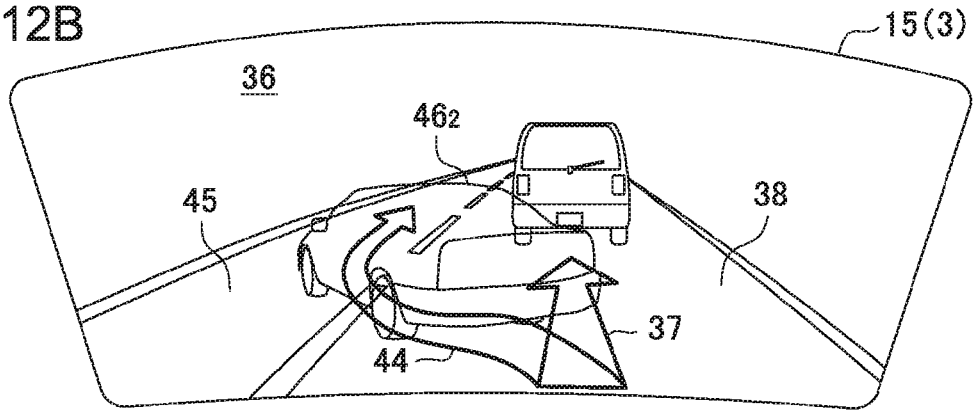
Figure 12C:
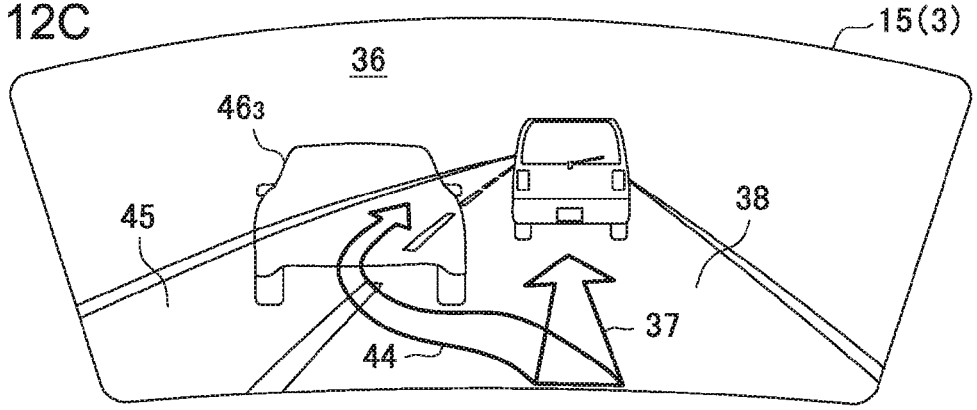

FIGS. 12A to 12D illustrate, in the order of time passage, a transition of that the virtual image 46 of the own vehicle displayed at the front windshield 15 performs lane change. First, the virtual image 46 starts as a virtual image $46_1$ in FIG. 12A illustrating a virtual vehicle having appearance and size as if the virtual vehicle is travelling just in front of the front windshield 15. The virtual vehicle moves from a position just in front of the front windshield 15 to the cruising lane 45 to be apart therefrom while changing orientation of the vehicle body as being similar to the actual vehicle along the travel course of the symbol image 44 as illustrated by the virtual images $46_2$, $46_3$ in FIGS. 12B and 12C. Then, the virtual vehicle completes movement to be the virtual image $46_4$ that is oriented to straightly travel on the cruising lane 45.

Figure 13A:
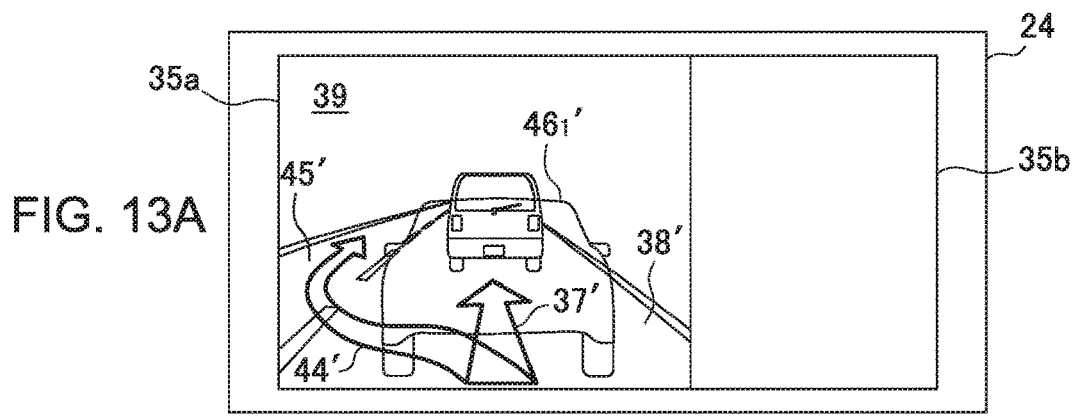
FIGS. 13A to 13D are schematic views illustrating lane change of the virtual vehicle displayed at the monitor device in the order of time passage corresponding to FIGS. 12A to 12D.
Figure 13B:
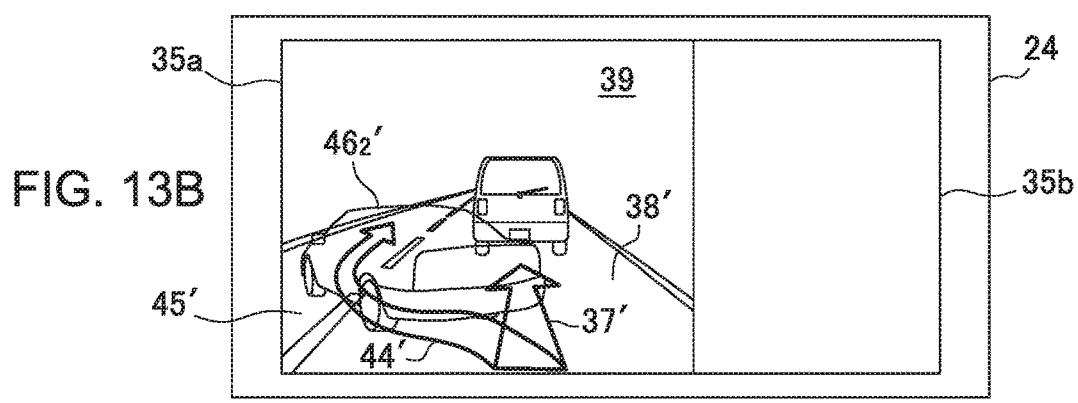
Figure 13C:
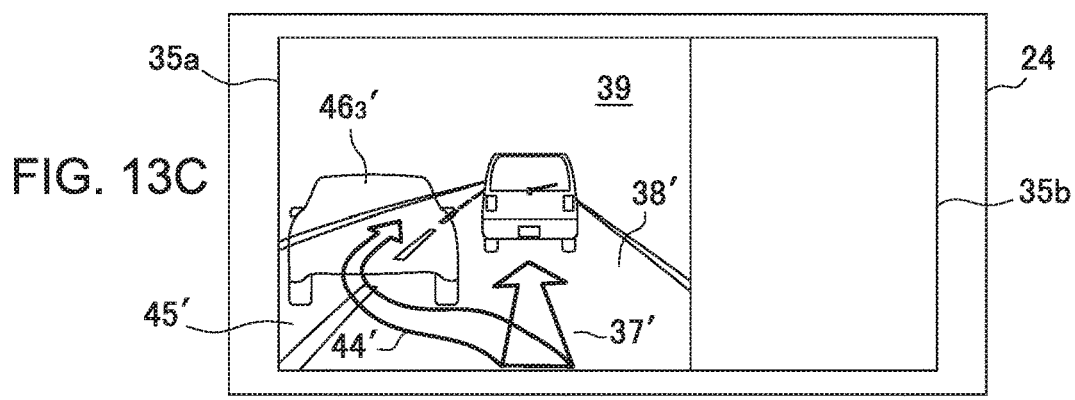
Figure 13D:
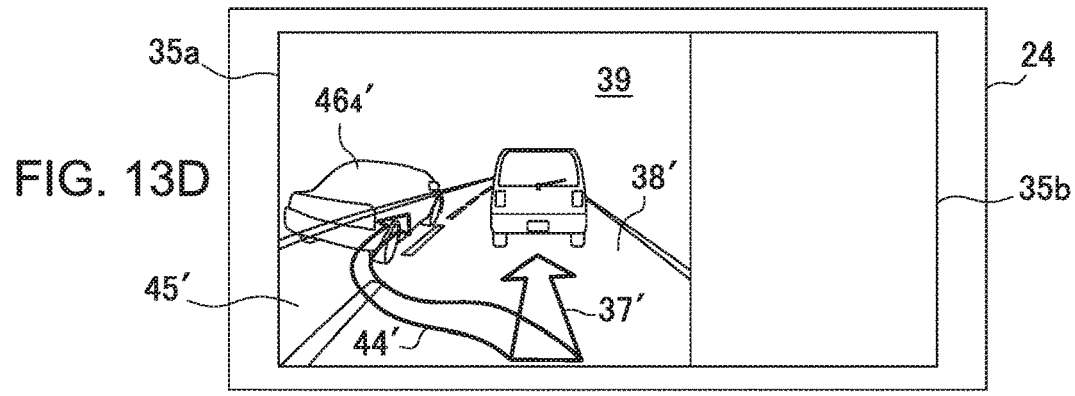

FIGS. 13A to 13D illustrate, in the order of time passage, a transition of that the virtual image 46' of the own vehicle displayed at the monitor device 24 performs lane change. First, the virtual image 46' starts, on the taken scenery 39, as a virtual image $46_1{}'$ in FIG. 13A illustrating a virtual vehicle having appearance and size as if the virtual vehicle is travelling just in front of the own vehicle. The virtual vehicle moves from the position just in front of the own vehicle to the cruising lane 45' to be apart therefrom while changing orientation of the vehicle body as being similar to the actual vehicle along the travel course of the symbol image 44' as illustrated by the virtual images $46_2{}'$, $46_3{}'$ in FIGS. 13B and 13C. Then, as illustrated in FIG. 13D, the virtual vehicle completes movement to be the virtual image $46_4{}'$ that is oriented to straightly travel on the cruising lane 45'.

Here, it is preferable that movement from the virtual image $46_1$, $46_1{}'$ to the virtual image $46_4$, $46_4{}'$ of the virtual vehicle is displayed at a speed being faster than an actual travel speed of the own vehicle. According to the above, the occupant is caused to evaluate necessity of cancelling of the lane change or switching to manual driving after the lane change is previously noticed until the timing of scheduled lane change to be performed by the automated driving control unit 7 of the automated driving system 2. Thus, time to spare can be kept for preparation if needed.

Figure 12D:
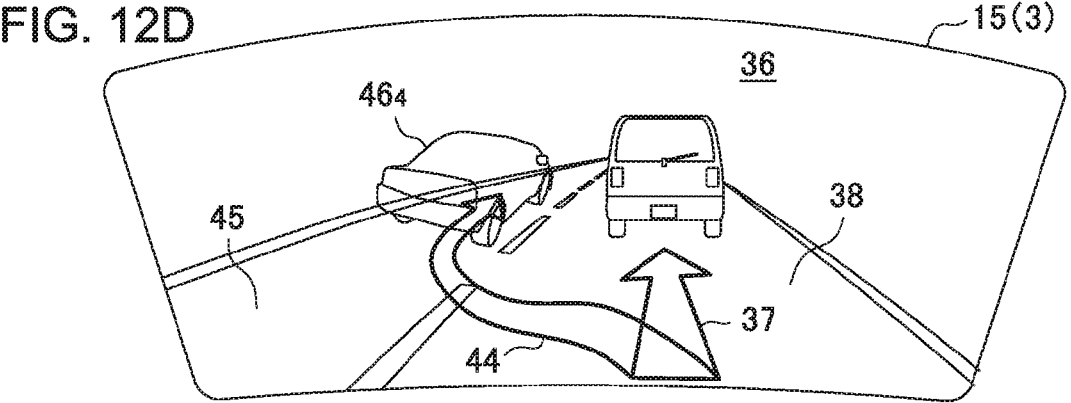

The virtual images $46_4$, $46_4{}'$ in FIGS. 12D and 13D may be erased just after completing movement of the virtual vehicle or may be maintained for a short period of time in a state of being displayed at the same positions respectively on the front windshield 15 and the monitor device 24. Further, the moving images from the virtual image $46_1$, $46_1{}'$ to the virtual image $46_4$, $46_4{}'$ may be displayed repeatedly.

The symbol image 44, 44' indicating the travel course for lane change may be moved along with displaying of the virtual image 46, 46'. For example, both of the symbol image 44, 44' and the virtual image 46, 46' may be continuously displayed until lane change with the automated driving actually starts. Alternatively, the symbol image 44, 44' and the virtual image 46, 46' may be displayed respectively for appropriate periods of time without being related to each other.

For example, the symbol image 44, 44' may be continuously displayed for a certain period of time from starting of lane change with automated driving or until the lane change therewith is completed. In this case, the own vehicle may be caused to actually travel as following the travel course of the symbol images 44, 44' displayed at the time when lane change starts.

Further, the virtual images $46_4$, $46_4'$ in FIGS. 12D and 13D may be continuously displayed until lane change with automated driving is completed. In this case, the virtual image $46_4$, $46_4'$ is displayed in the vicinity of a leading end of the arrow of the symbol image 44, 44'. Accordingly, when the own vehicle actually travels to follow the symbol images 44, 44' displayed at the time when lane change starts, the own vehicle is displayed to gradually approach the virtual images $46_4$, $46_4'$ on the respective screens of the front windshield 15 and the monitor device 24. Then, the virtual images $46_4$, $46_4'$ can be erased to be absorbed into the respective screens.

Figure 14A:
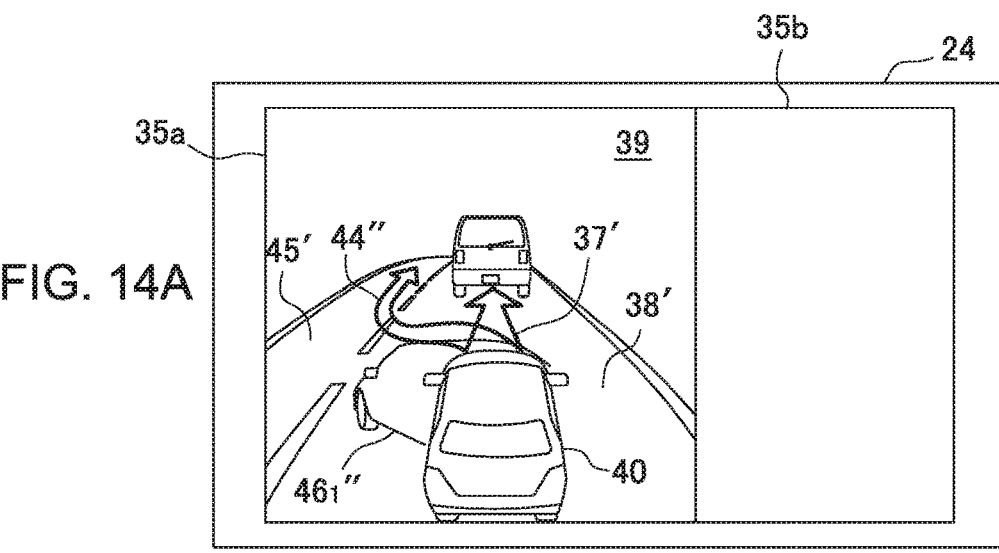
FIGS. 14A to 14C are schematic views similarly illustrating a modified example of FIGS. 13A to 13D.
Figure 14B:
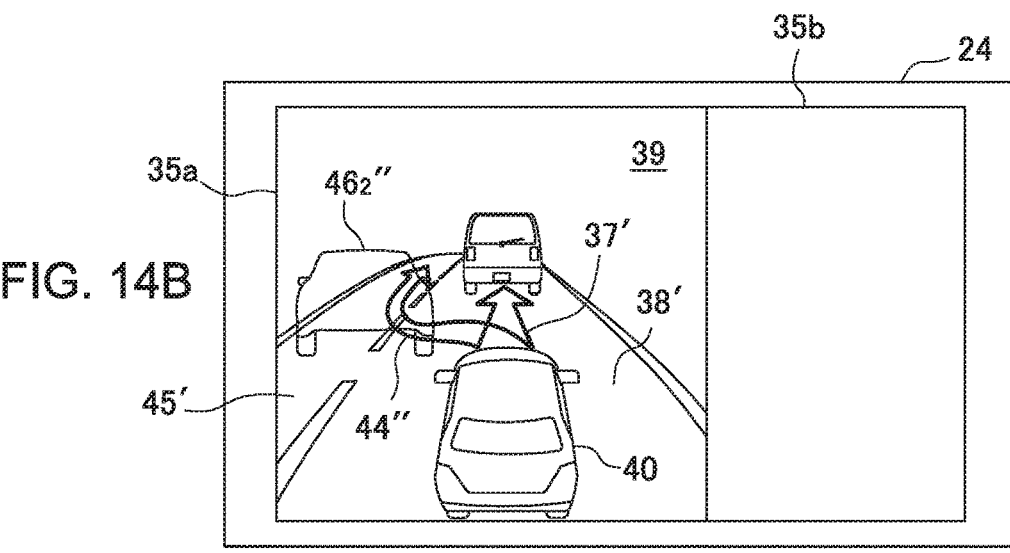
Figure 14C:
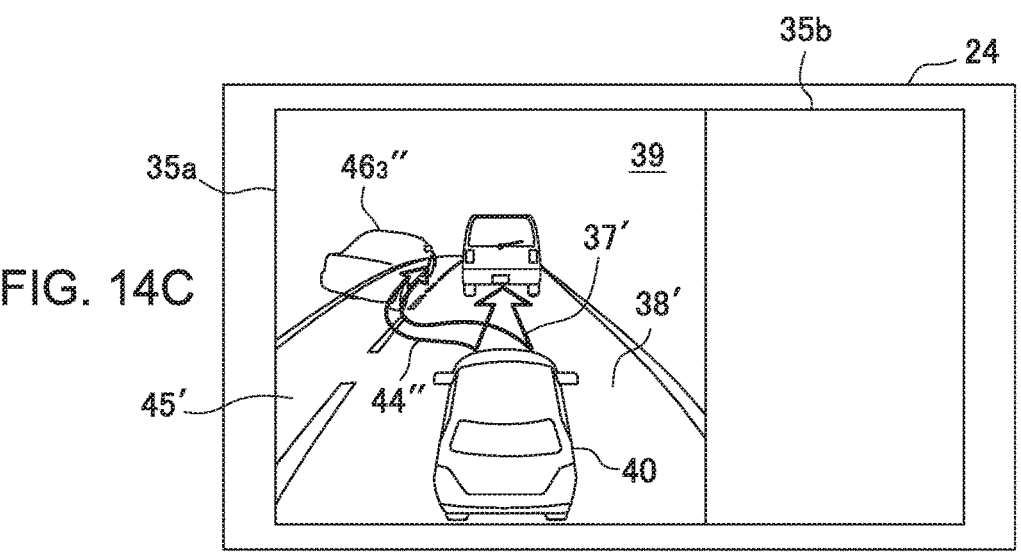

FIGS. 14A to 14C illustrate a modified example of screens displayed at the monitor device 24 being the second display device 4. In this modified example, prior notice of lane change is displayed on the display screen of FIG. 8 on which the picture image 40 of the travelling own vehicle is displayed at the behavior display area 35a of the monitor device 24.

The display control unit 5 of the vehicle image display system 1 that is instructed to display prior notice of lane change by the automated driving control unit 7 of the automated driving system 2 processes image data obtained from the display information storing unit 6, generates a symbol image 44" indicating a travel course for lane change, and displays the symbol image 44" as superimposing to the normal screen of FIG. 8. Similarly to the example of FIG. 12B, the symbol image 44" may be continuously displayed at least during the prior notice is displayed, and further, for a certain period of time from starting of lane change with automated driving or until the lane change therewith is completed.

The symbol image 44' is formed as an arrow mark extending from a position on an overtaking lane 38' in the taken scenery 39 to a position on an adjacent cruising lane 45' being an aimed lane. The arrow of the symbol image 44" starts from a front end of the picture image 40 of the own vehicle and is curved along a trajectory on which the own vehicle is previously noticed to travel with automated driving. Similarly to the symbol images 44, 44', it is preferable that the symbol image 44" is displayed in a color and/or brightness different from the color and/or brightness of the symbol images 37, 37' to be distinctively recognizable.

Further, at the behavior display area 35a of the monitor device 24, a virtual vehicle of the own vehicle that performs lane change is displayed as a moving image of a virtual image 46". The virtual image 46" is displayed so that the virtual vehicle of the own vehicle travels on the arrow of the symbol image 44" indicating the travel course for lane change as having the arrow as the trajectory therefor. Similarly to FIGS. 13A to 13D, FIGS. 14A to 14C illustrate, in the order of time passage, a transition of that the virtual image 46" of the own vehicle performs lane change on the display screen of the monitor device 24.

First, the virtual image 46" starts, on the actual scenery as a virtual image $46_1$" in FIG. 14A illustrating a virtual vehicle having approximately the same size as the picture image 40 of the own vehicle and moving out of the picture image 40 toward the cruising lane 45'. As illustrated by a virtual image $46_2$" in FIG. 14B, the virtual vehicle moves to the cruising lane 45' to be apart therefrom while changing orientation of the vehicle body as being similar to the actual vehicle along the travel course of the symbol image 44". Then, as illustrated in FIG. 14C, the virtual vehicle completes movement to be the virtual image $46_3$" that is oriented to straightly travel on the cruising lane 45'. Since the rest of description regarding the virtual image 46" is similar to that in the case of FIGS. 13A to 13D, description thereof will not be repeated.

As one of factors that causes requirement for lane change in FIGS. 11A and 11B, it is considered to be a case that another vehicle is getting closer from the rear at a high speed. It is considered that an occupant in travelling with automated driving has a less degree of concern and/or attention to following vehicles compared to travelling with manual driving. Accordingly, it is preferable to perform displaying at the first and/or second display devices 3, 4 for calling attention on rapid approaching of a following vehicle at the same time to perform displaying of prior notice of lane change.

Figure 15A:
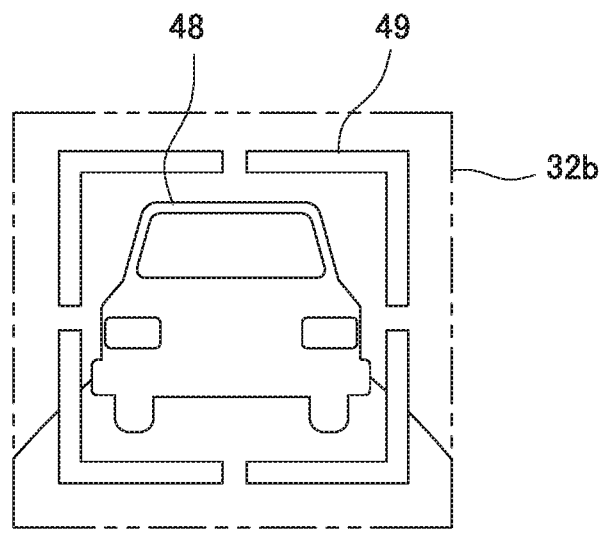
FIGS. 15A to 15C are rear view display images each illustrating a following vehicle.
Figure 15B:
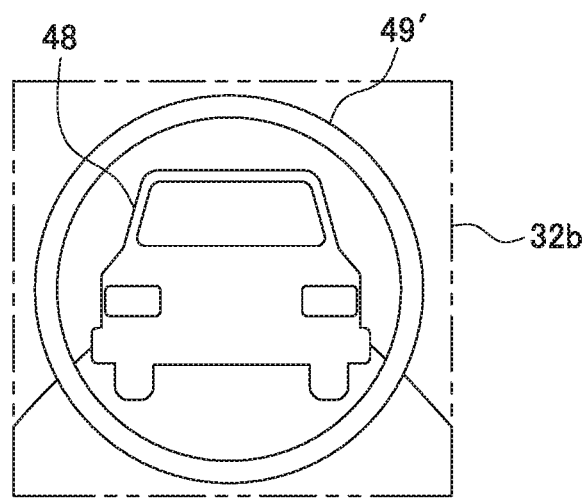
Figure 15C:
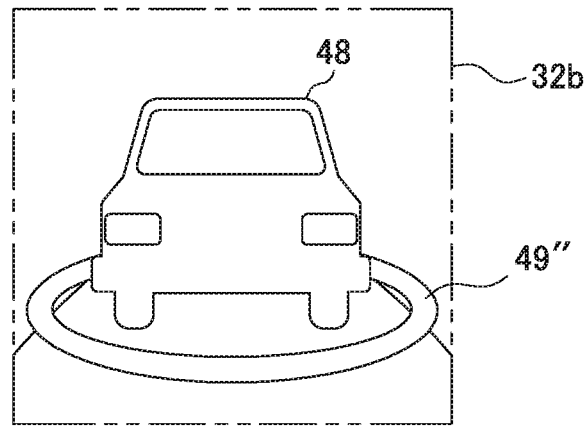

FIGS. 15A to 15C exemplify rear view display images indicating rapid approaching of such a following vehicle at the first display device 3. FIG. 15A illustrates an image of a following vehicle 48 projected at the right auxiliary display area 32b of the front windshield 15. This image is a real-time image of the following vehicle 48 taken by the right rear camera 18b from the straight front.

A thick-frame attention-calling mark 49 that is approximately rectangular is added to the following vehicle 48 to surround the outline thereof. Instead of such a rectangular thick frame, the attention-calling mark 49 may have any of a variety of shapes and signs. For example, an attention-calling mark 49' of a modified example illustrated in FIG. 15B is formed as a round thick frame. An attention-calling mark 49" illustrated in FIG. 15C is formed as an elliptic thick frame with a part thereof eliminated to surround the following vehicle 48 on a road.

The attention-calling mark 49, 49', 49" is displayed for calling attention of an occupant based on that the following vehicle 48 is recognized as a vehicle rapidly approaching the own vehicle from the rear. Accordingly, it is preferable that the attention mark 49, 49', 49" is displayed in a striking color such as red and orange. Here, it is also possible to vary the color in accordance with a distance between the own vehicle and the following vehicle 48. For example, the color may vary from yellow to orange and to red in accordance with decrease of the distance between the own vehicle and the following vehicle 48. Further, it is possible to call more attention of an occupant by blinking the attention-calling mark 49, 49', 49".

At the first display device 3, the following vehicle 48 may be displayed at the center auxiliary display area 32c of the first display device 3 of the front windshield 15 instead of the right auxiliary display area 32b thereof. In a case that the center rear camera is not mounted on the own vehicle, the following vehicle 48 is displayed at the center auxiliary display area 32c as a picture image not as a taken image. In another example, the following vehicle 48 may be displayed at the rearview mirror 25 as the third display device.

Next, description will be provided on screen displaying of prior notice of lane change to avoid an obstacle when the obstacle exists at a leading part of a scheduled travel course during travelling with automated driving. The automated driving control unit 7 of the automated driving system 2 can previously detect an obstacle existing on the scheduled travel course of the own vehicle based on images taken by the front camera 16 and/or information input from the information input unit 8 through radio communication with the outside such as vehicle-to-vehicle communication and road-to-vehicle communication described above.

When lane change from a cruising lane to an overtaking lane or an opposing lane is determined to be performed for avoiding such an obstacle, the display control unit 5 of the vehicle image display system 1 is instructed to display prior notice of the lane change. The display control unit 5 obtains image data necessary for displaying prior notice of lane change from the display information storing unit 6, generates display images through necessary processes, and displays the images at the first and second display devices 3, 4.

Figure 16A:
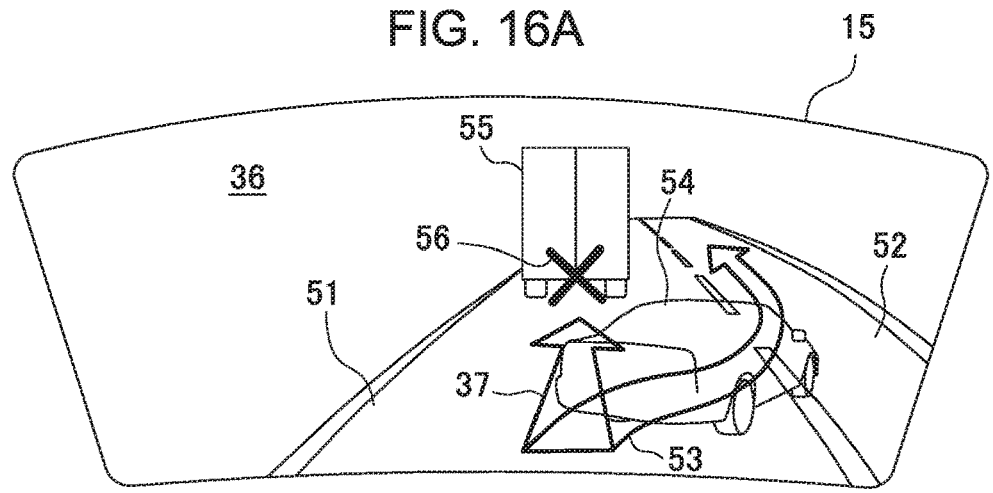
FIGS. 16A to 16C are schematic views illustrating different lane change displayed at the front windshield in the order of time passage.
Figure 16B:
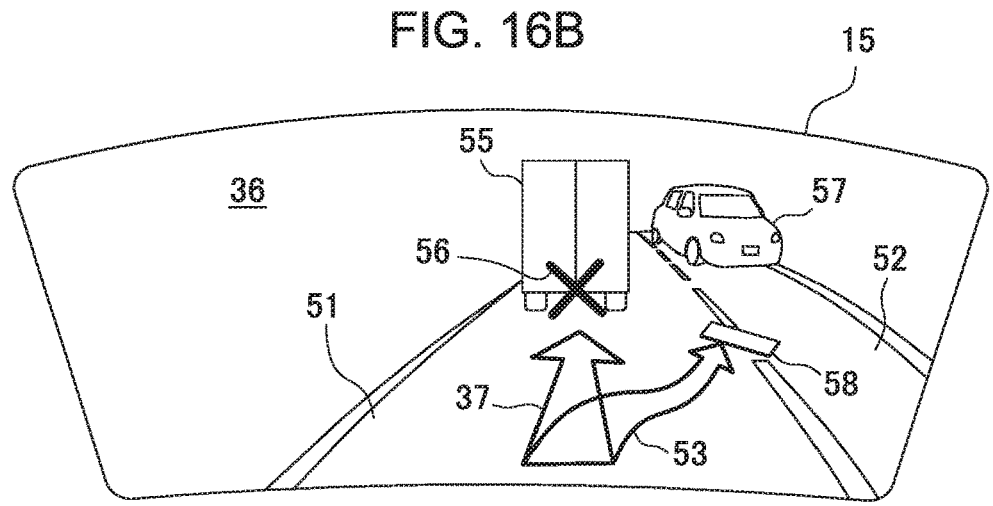
Figure 16C:
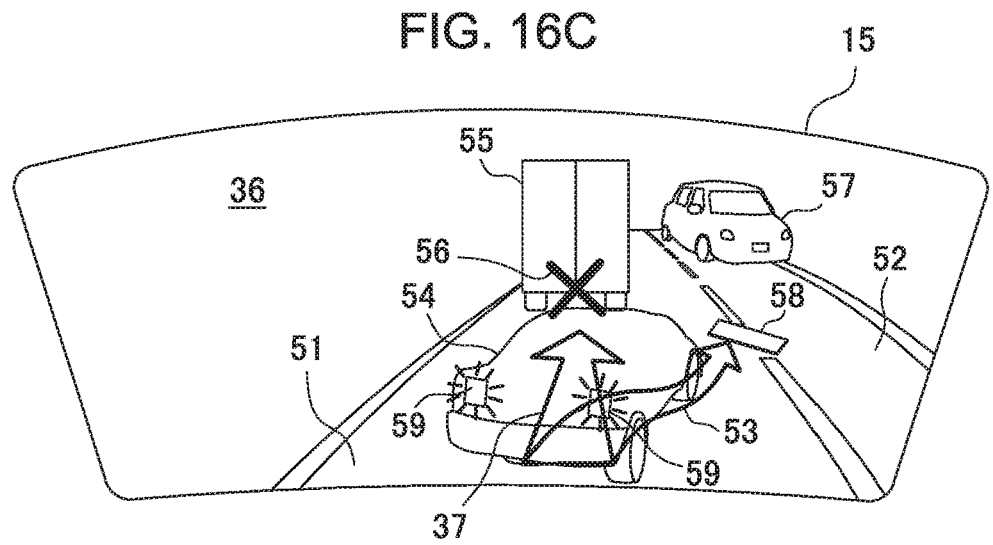
Figure 17A:
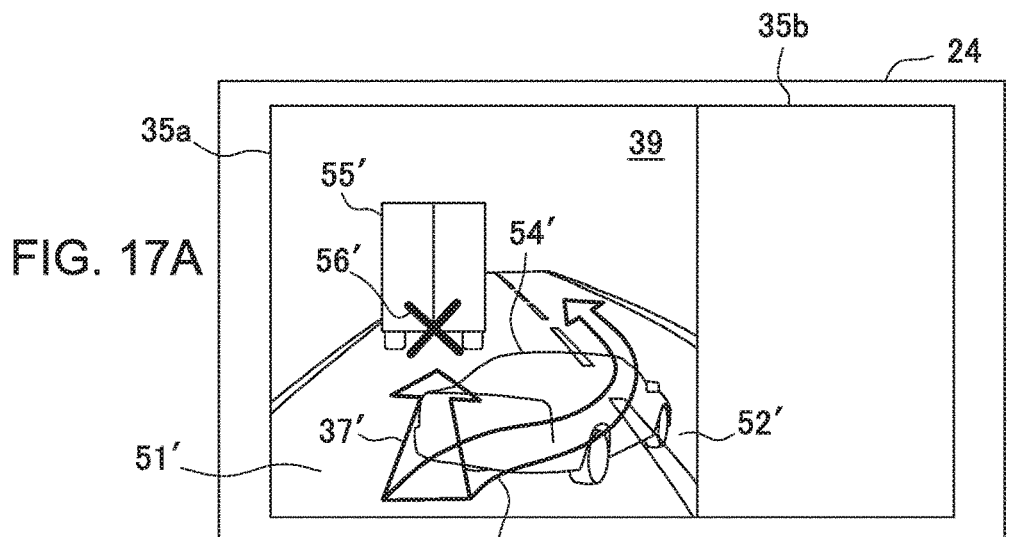
FIGS. 17A to 17C are schematic views illustrating the lane change of FIG. 16 displayed at the monitor device in the order of time passage.
Figure 17B:
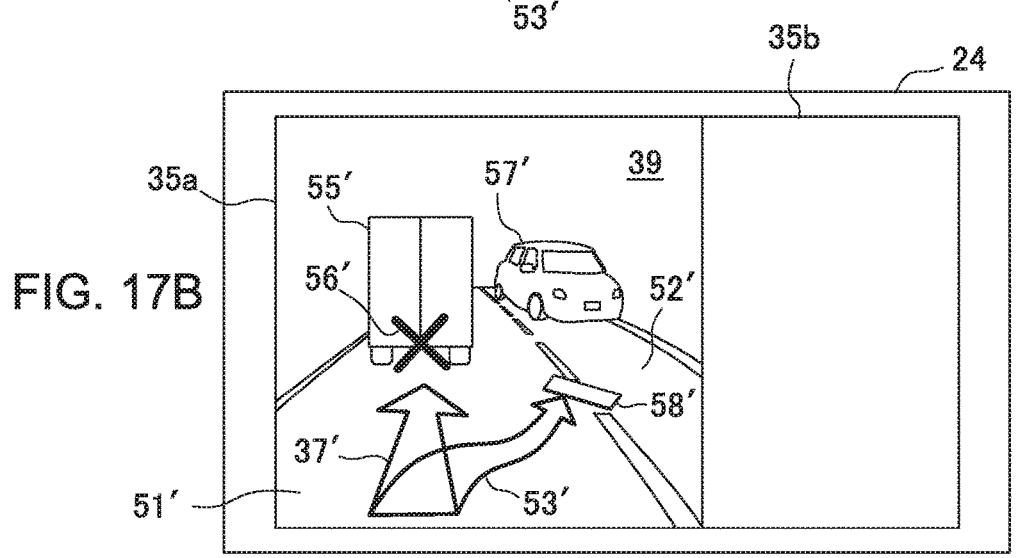
Figure 17C:
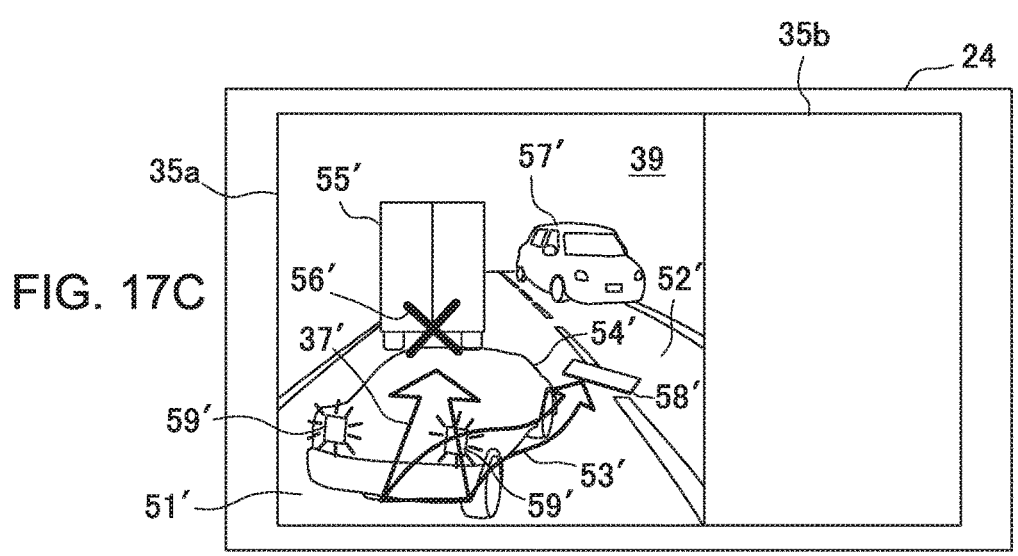

FIGS. 16A to 16C schematically illustrate, in the order of time passage, an example of displaying prior notice at the first display device 3, that is, the front windshield 15 in a case that lane change is performed from a cruising lane 51 to an opposing lane 52. FIGS. 17A to 17C schematically illustrate, in the same order of time passage, displaying of prior notice at the second display device 4, that is, the monitor device 24 in the above case.

In addition to the arrow of the symbol image 37 indicating the scheduled travel course, a symbol image 53 indicating a travel course for lane change to the opposing lane 52 is displayed at the front windshield 15 as illustrated in FIG. 16A. The symbol image 53 is formed as an arrow mark that is similar to the symbol image 44 in FIG. 11A. However, it is not limited thereto. Similarly to the abovementioned embodiment, it is preferable that the symbol image 53 is displayed in a color that is different from and more striking than the color of the symbol image 37. The symbol image 53 may be displayed instead of the symbol image 37.

Further, a virtual vehicle of the own vehicle that performs lane change is displayed at the front windshield 15 as a moving image of a virtual image 54. The virtual image 54 is displayed so that the virtual vehicle of the own vehicle travels on the arrow of the symbol image 53 indicating the travel course for lane change as having the arrow as the trajectory therefor. Similarly to the abovementioned embodiment, it is also preferable that the virtual image 54 is displayed, for example, as being entirely translucent in white or a light color to the extent that at least outline of the own vehicle is recognizable so as to prevent misrecognition and confusion with an actual vehicle for the occupant.

Further, an attention-calling mark for causing the occupant to recognize an obstacle on the scheduled travel course may be added to be displayed at the front windshield 15. In FIG. 16A, an X mark being the attention-calling mark 56 is displayed at a position behind a large-sized vehicle 55 parking/stopping on a road. In consideration of the purpose of the nature thereof, it is preferable that the attention-calling mark 56 is displayed in a striking color such as red and orange, and more preferable that the attention-calling mark 56 is displayed as being blinked.

After or before the automated driving control unit 7 of the automated driving system 2 determines to perform lane change to the opposing lane and causing the display control unit 5 to display prior notice of FIG. 16A, the automated driving control unit 7 can detect approaching of an oncoming vehicle 57 on the opposing lane 52. When the automated driving control unit 7 determines that it is necessary to stop once on the cruising lane 51 before performing lane change and wait passing of the oncoming vehicle 57, the automated driving control unit 7 instructs the display controller to display a position for the temporal stop and prior notice necessary therefor.

The display control unit 5 displays, for example, a stop like mark 58 as illustrated in FIG. 16B to be matched with a position for the temporal stop on the road in the actual scenery viewed through the front windshield 15. An arrow of the symbol image 53 indicating the travel course for lane change is corrected so that the leading end thereof is matched with the stop line mark 58. Not limited to the mark illustrated in FIG. 16B, the stop line mark 58 may adopt any of a variety of shapes.

In this case, the virtual image 54 of the own vehicle to perform lane change starts to travel on the travel course of the symbol image 53 so that the virtual image 54 moves out frontward from a position just in front of the front windshield 15 as being similar to the case of FIG. 16A. Then, the virtual image 54 stops at the position of the stop line mark 58, for example, as illustrated in FIG. 16C. At that time, owing to that a brake lamp 59 at the rear is lighted or blinked in red, the virtual vehicle of the virtual image 54 causes the occupant to recognize temporal stop.

FIG. 17A illustrates a screen of prior notice displayed at the monitor device 24 corresponding to the front windshield 15 in FIG. 16A. As illustrated in FIG. 17A, in addition to the symbol image 37' indicating the scheduled travel course, a symbol mark 53' formed as an arrow mark indicating a travel course for lane change is displayed at the behavior display area 35a of the monitor device 24 having the scenery 39 taken by the front camera as a background. Here, the symbol image 53' may be displayed instead of the symbol image 37'.

Further, a virtual vehicle of the own vehicle that performs lane change is displayed as well at the monitor device 24 as a moving image of a virtual image 54'. The virtual image 54' is displayed so as to travel on the arrow of the symbol image 53' indicating the travel course for lane change as having the arrow as the trajectory therefor. The virtual image 54' is displayed as well, for example, as being entirely translucent in white or a light color to the extent that at least outline of the own vehicle is recognizable so as to prevent misrecognition and confusion with an actual vehicle for the occupant.

Further, as illustrated in FIG. 17A, an X mark being an attention-calling mark 56' is displayed at the monitor device 24 as well at a position behind a large-sized vehicle 55' parking/stopping on a road, so that the occupant is caused to recognize the obstacle being on the scheduled travel course. It is preferable similarly that the attention-calling mark 56' is displayed in a striking color such as red and orange, and further, is displayed as being blinked.

When it is necessary to wait passing of an oncoming vehicle 57' getting closer on an opposing lane 52', a stop line mark 58' as illustrated in FIG. 17B is displayed on the taken scenery 39 at the monitor device 24 to be matched with a position where the own vehicle is to stop. An arrow of the symbol 53' is corrected so that the leading end thereof is matched with the stop line mark 58'. Any of a variety of shapes other than the shape in FIG. 17B may be adopted for the stop line mark 58.

In this case, the virtual image 54' of the own vehicle to perform lane change starts to travel on the travel course of the symbol 53' so that the virtual image 54' moves out frontward from a position just in front of the screen of the monitor device 24 as being similar to the case of FIG. 16A. Then, the virtual image 54' stops at the position of the stop line mark 58' as illustrated in FIG. 17C. At that time, owing to that a brake lamp 59' at the rear is lighted or blinked in red, the virtual vehicle of the virtual image 54' causes the occupant to recognize temporal stop.

Figure 18A:
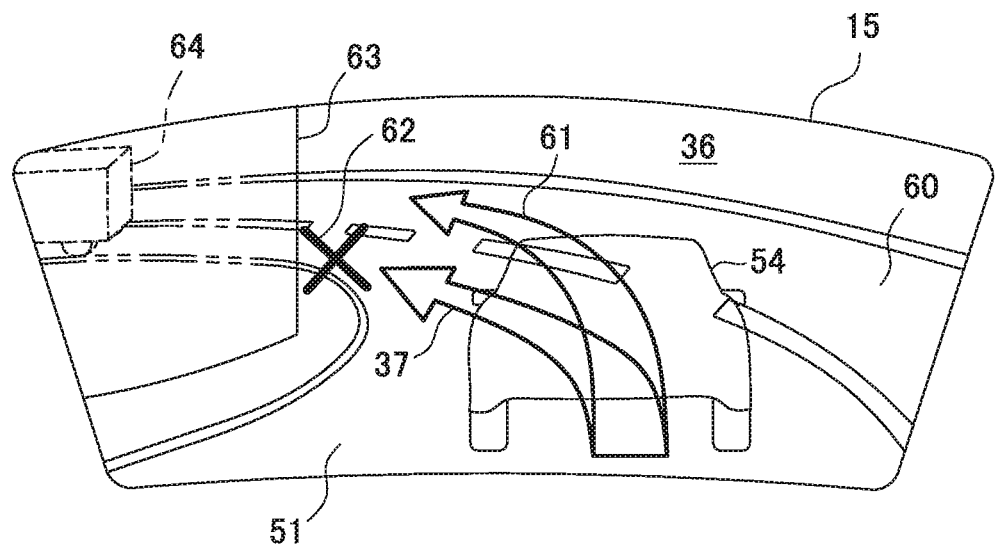
FIGS. 18A and 18B are schematic views illustrating screen displaying of different lane change.
Figure 18B:
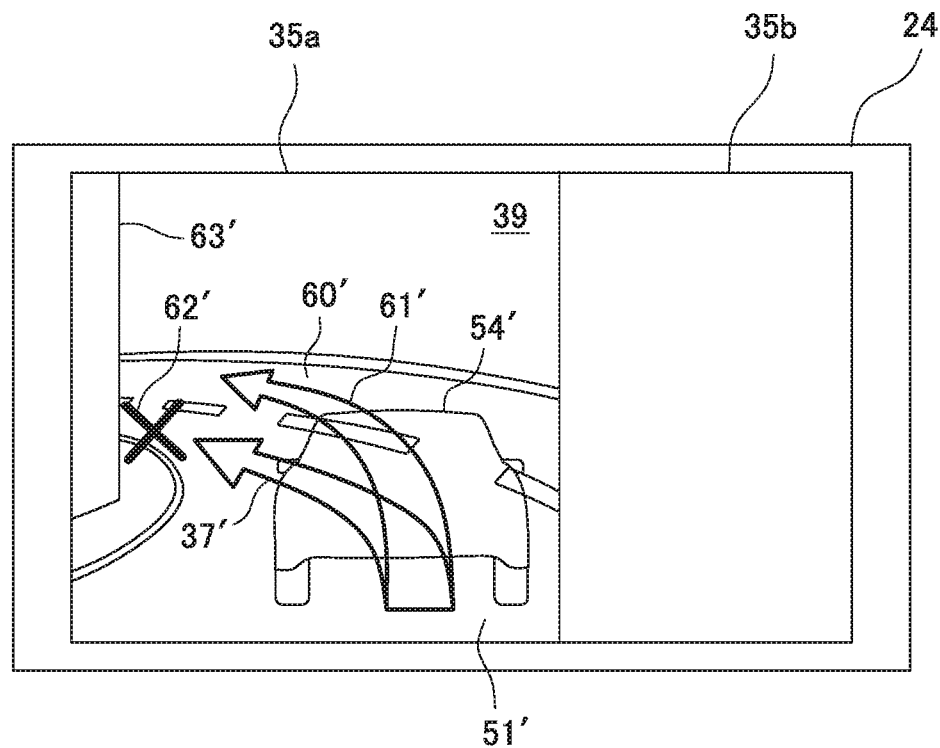

The automated driving control unit 7 of the automated driving system 2 can previously detect presence of an obstacle on the scheduled travel course through radio communication with the outside such as vehicle-to-vehicle communication and road-to-vehicle communication described above even in a case that the obstacle cannot be viewed as being behind a building or the like during automated driving on a curved road. FIGS. 18A and 18B schematically illustrate a screen of prior notice displayed respectively at the first and second display devices 3, 4 in advance in a case that lane change is to be performed from the cruising lane 37, 37' to the overtaking lane 60, 60' to avoid such an obstacle.

At the first display device 3, a symbol image 61 indicating the travel course for the lane change is displayed at the front windshield 15 in addition to the symbol image 37 indicating the scheduled travel course. Similarly, at the second display device 4, a symbol image 61' indicating the travel course for the lane change is displayed at the behavior display area 35*a* of the monitor device 24 in addition to the symbol image 37' indicating the scheduled travel course. The symbol image 61, 61' is not limited to the illustrated arrow mark and may be displayed instead of the symbol mark 37, 37'

Further, at the first display device 3, a virtual vehicle of the own vehicle that performs lane change is displayed as a moving image of a virtual image 54. Similarly, at the second display device 4 as well, a virtual vehicle of the own vehicle that performs lane change is displayed as a moving image of a virtual image 54'. Since the virtual images 54, 54' are displayed similarly to the cases in FIGS. 16A to 16C and FIGS. 17A to 17C, description thereof will not repeated.

Further, an X mark being an attention-calling mark 62, 62' is displayed at each of the first and second display devices 3, 4 for causing the occupant to recognize the obstacle on the scheduled travel course. The attention-calling mark 62 is displayed at the front windshield 15 at a position on the cruising lane 51 near a building 63 to indicate that a large-sized vehicle 64 being the obstacle is parking/stopping behind the building 63. Similarly, the attention-calling mark 62' is displayed at the monitor device 24 at a position on the cruising lane 51' near a building 63'. It is preferable that the attention-calling mark 62, 62' is displayed in a striking color such as red and orange, and further, is displayed as being blinked.

The embodiments in FIGS. 16 to 18 are not limited to the case that an obstacle on the scheduled travel course is a parking/stopping vehicle. For example, the embodiments may be applied similarly to a case that a construction work or an accident exists on the scheduled travel course and a case when the own vehicle overtakes, with automated driving, a vehicle at least travelling at a lower speed than the own vehicle at the front on the scheduled travel course.

FIGS. 19A to 19C and FIGS. 20A to 20C schematically illustrate a screen of prior notice displayed respectively at the first and second display devices 3, 4 in advance in a case that the own vehicle during travelling on a cruising lane 66 with automated driving makes a U-turn to an opposing lane 67 as being deviated from the scheduled travel course 37. First, a symbol image 68 indicating a travel course for the U-turn is displayed at the first display device 3 in addition to the symbol image 37 indicating the scheduled travel course. Similarly, a symbol image 68' indicating the travel course for the U-turn is displayed as well at the second display device 4 in addition to the symbol image 37' indicating the scheduled travel course.

At the first display device 3, the symbol image 68 is formed as an arrow mark curved along a trajectory on which the own vehicle is previously noticed to make a U-turn from a position on the cruising lane 66 in the actual scenery 36 to a position on the adjacent opposing lane 67. At the second display device 4 as well, the symbol image 68' is formed as an arrow mark curved along a trajectory on which the own vehicle is previously noticed to make a U-turn from a position on a cruising lane 66' in the taken scenery 39 to a position on an adjacent opposing lane 67'. Here, the symbol images 68, 68' may be displayed instead of the symbol image 37, 37'.

Figure 19A:
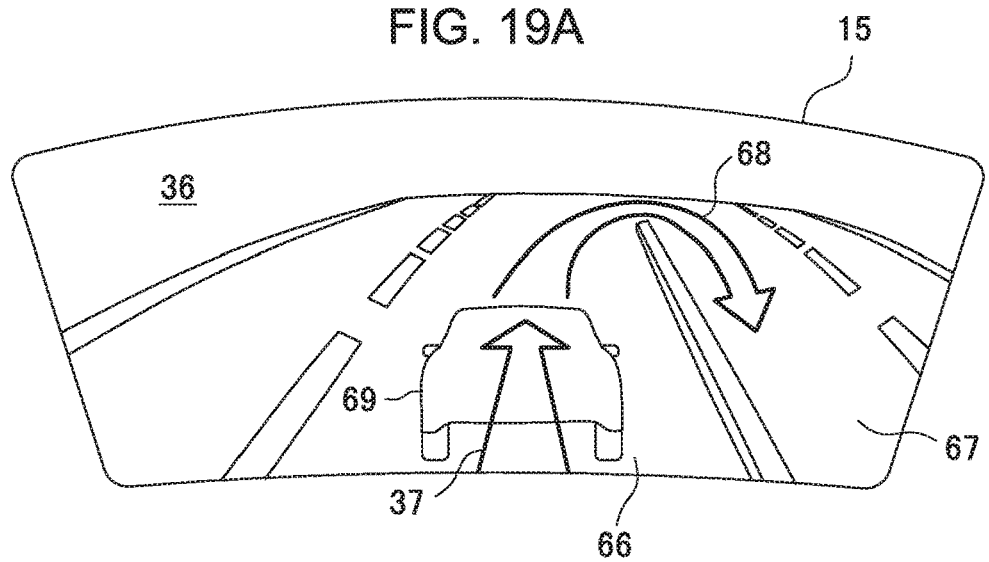
FIGS. 19A to 19C are schematic views illustrating screen displaying at the front windshield in the order of time passage in a case a U-turn is performed.
Figure 19B:
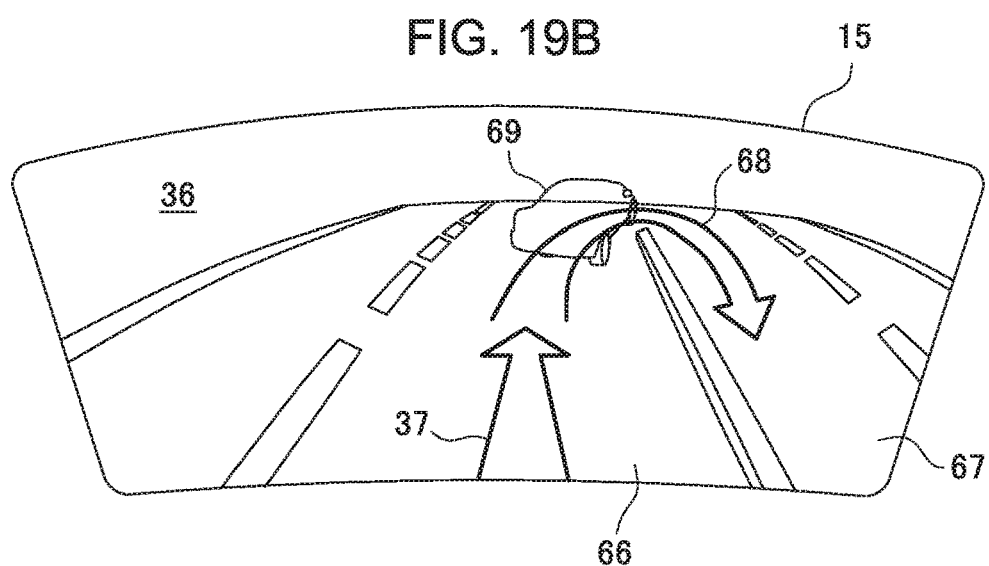
Figure 19C:
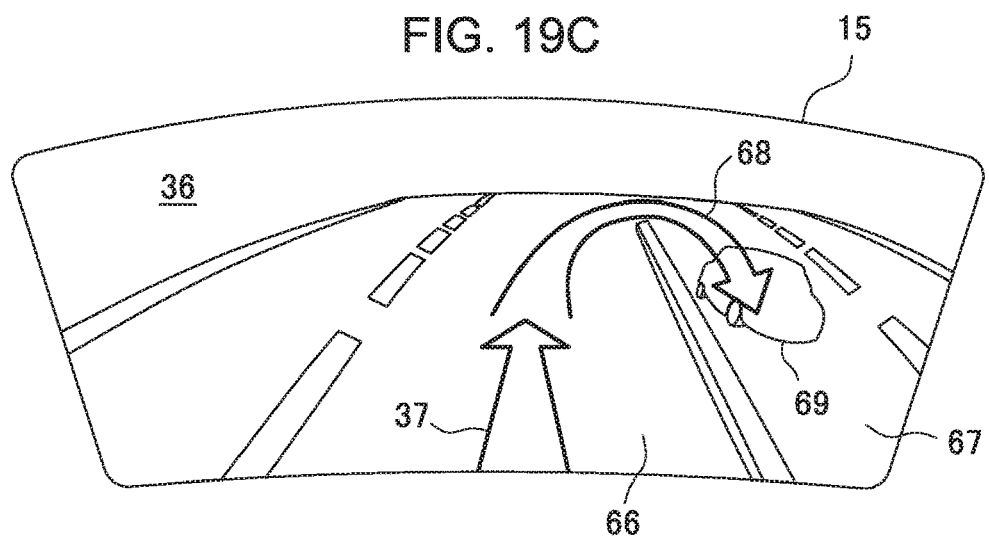

Further, a virtual vehicle of the own vehicle that makes a U-turn is displayed at the first display device 3 as a moving image of a virtual image 69 as being superimposed to the actual scenery 36. The virtual image 69 is displayed so that the virtual vehicle of the own vehicle makes a U-turn on the arrow of the symbol image 68 as having the arrow as the trajectory therefor. Specifically, the virtual image 69 appears to move out frontward from the front windshield 15 as illustrated in FIG. 19A, moves at a high speed to a turning position illustrated in FIG. 19B, and travels toward the own vehicle side on the opposing lane 67 as illustrated in FIG. 19C.

Figure 20A:
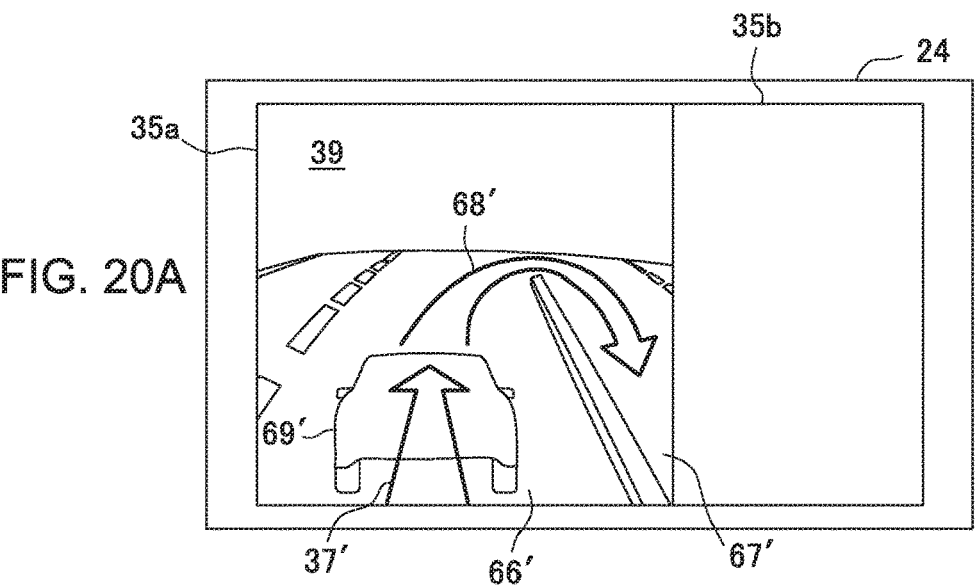
FIGS. 20A to 20C are schematic views illustrating screen displaying at the monitor device in the order of time passage in a case of the U-turn of FIGS. 19A to 19C.
Figure 20B:
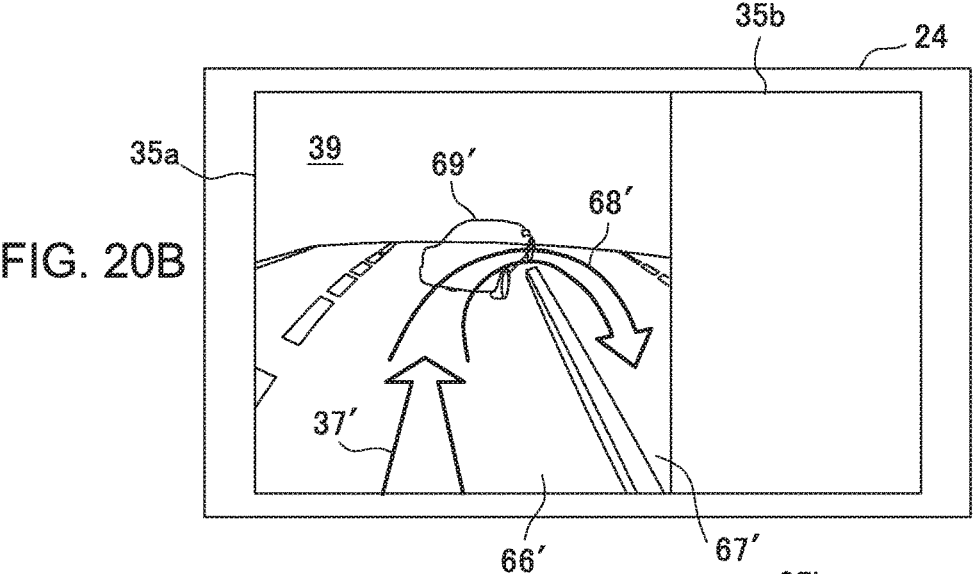
Figure 20C:
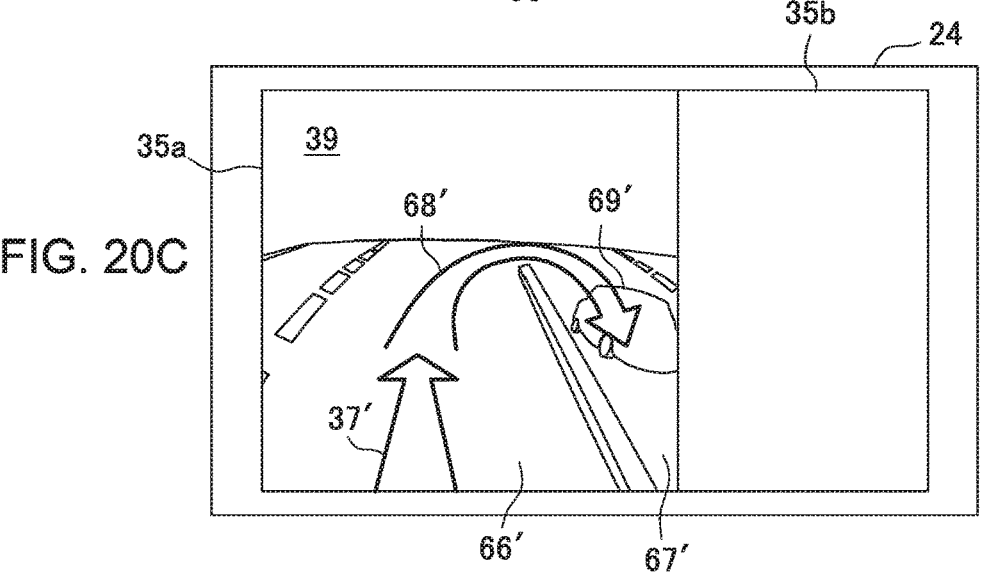

Similarly, a virtual vehicle of the own vehicle that makes a U-turn is displayed as well at the second display device 4 as a moving image of a virtual image 69' as being superimposed to the taken scenery 39. The virtual image 69' is displayed so that the virtual vehicle of the own vehicle makes a U-turn on the arrow of the symbol image 68' as having the arrow as the trajectory therefor. Specifically, the virtual image 69' appears to move out frontward from a position just in front of the screen of the monitor device 24 as illustrated in FIG. 20A, moves at a high speed to a turning position illustrated in FIG. 20B, and travels toward the own vehicle side on the opposing lane 67' as illustrated in FIG. 20C.

For example, in a case of emergency, the automated driving control unit 7 of the automated driving system 2 can find a parking/stopping space at a road shoulder of a road on which the own vehicle is travelling and make the own vehicle stop or park thereat. When parking/stopping to the road shoulder is determined to be performed, the automated driving control unit 7 instructs the display control unit 5 of the vehicle image display system 1 to display prior notice of parking/stopping to the road shoulder. Determination of parking/stopping to the road shoulder is performed while confirming that there is a space where the own vehicle can safely park/stop based on road situations around the own vehicle obtained, for example, from the front camera 16 and a variety of sensors mounted on the own vehicle, road traffic information stored in the automated driving information storing unit 9, and/or road information obtained through radio communication with the outside such as road-to-vehicle communication.

Figure 21A:
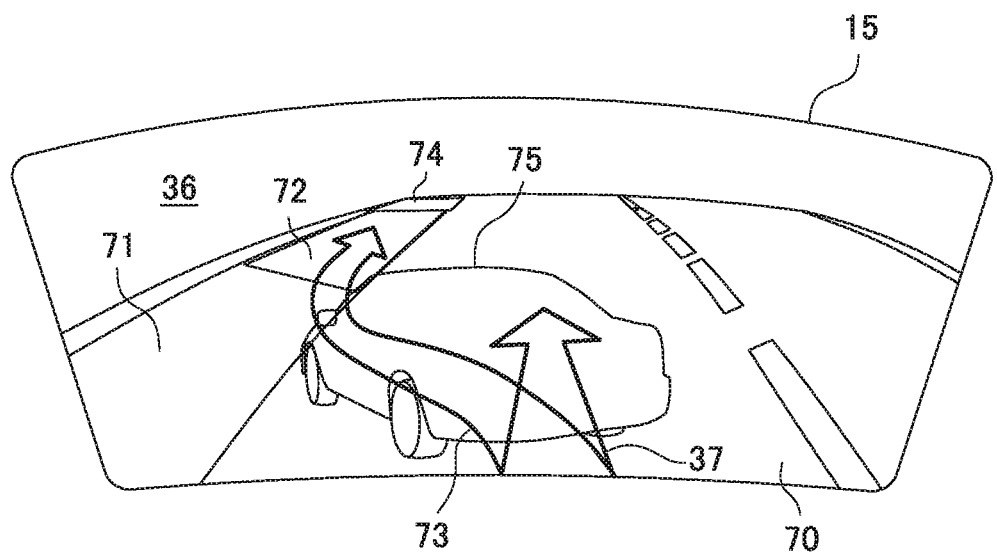
FIGS. 21A and 21B are schematic views illustrating screen displaying at the front windshield in the order of time passage in a case of performing parking/stopping on a road shoulder.
Figure 21B:
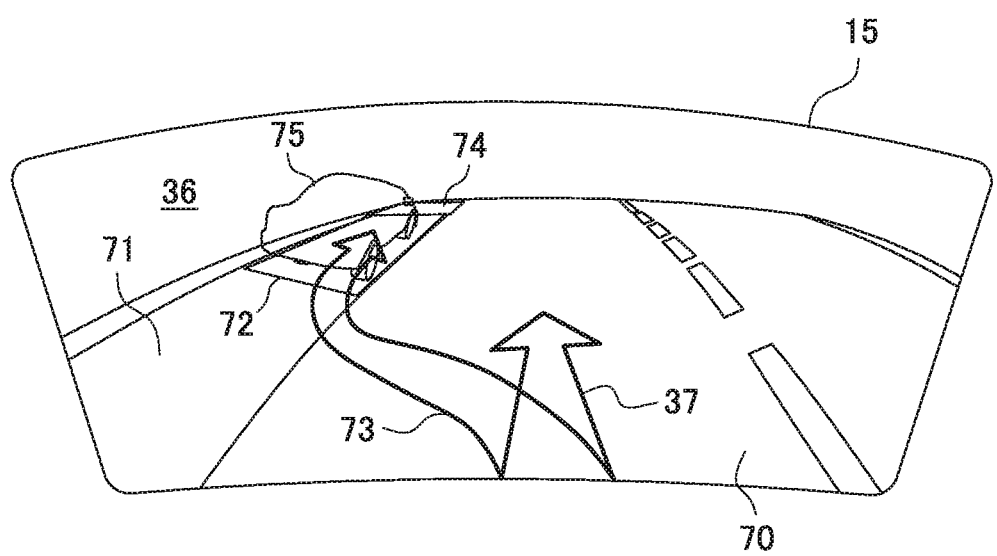

FIGS. 21A and 21B and FIGS. 22A and 22B schematically illustrate a screen of prior notice displayed respectively at the first and second display devices 3, 4 in advance in a case that the own vehicle during travelling with automated driving performs parking/stopping on a road shoulder 71, 71' of a road 70, 70' as being deviated from the scheduled travel course 37. As illustrated in FIG. 21A, in addition to the symbol image 37 indicating the scheduled travel course, symbol images 72, 73, 74 respectively indicating a planned parking/stopping space, a travel course for parking/stopping, and a stop line mark for parking/stopping are displayed at the first display device 3 as being matched with the position of the road shoulder 71 in the actual scenery 36. The symbol image 72 indicating the planned parking/stopping space may be displayed as an outline box shape.

Figure 22A:
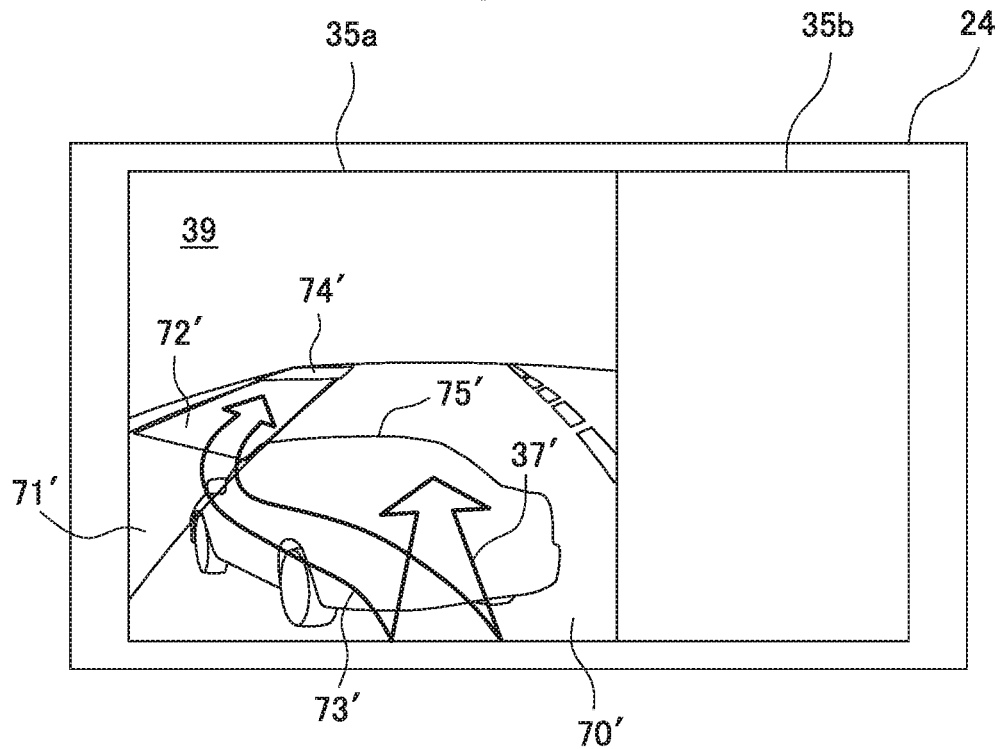
FIGS. 22A and 22B are schematic views illustrating screen displaying at the monitor device in the order of time passage in a case of the parking/stopping of FIGS. 21A and 21B.
Figure 22B:
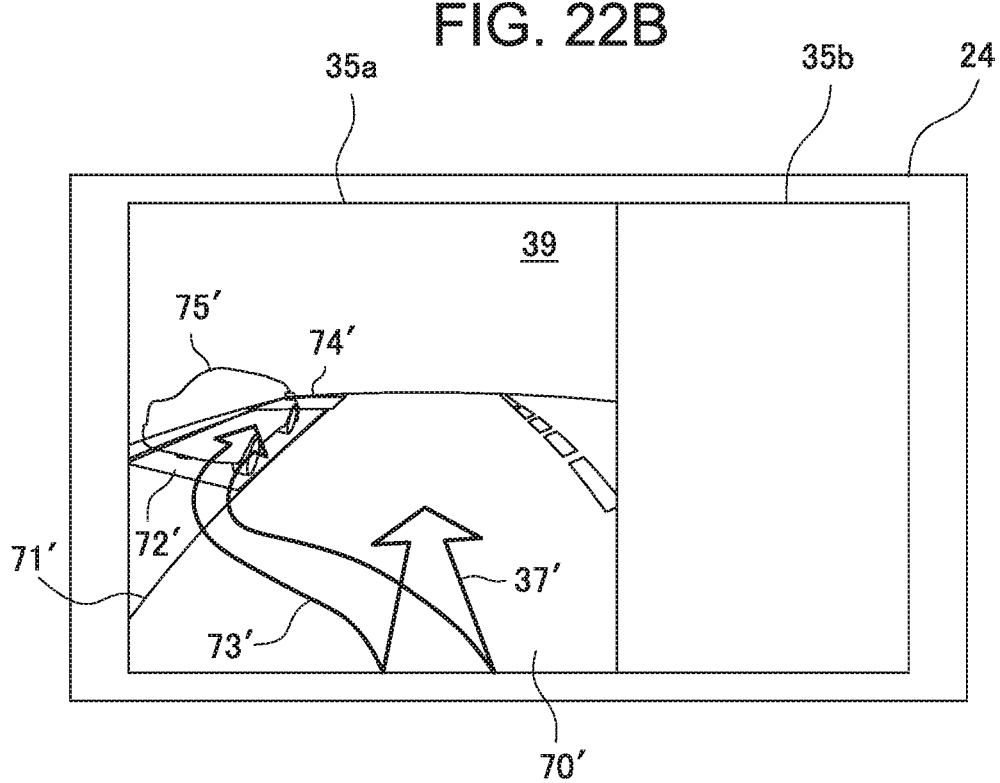

Similarly, as illustrated in FIG. 22A, in addition to the symbol image 37' indicating the scheduled travel course, symbol images 72', 73', 74' respectively indicating a planned parking/stopping space, a travel course for parking/stopping, and a stop line mark for parking/stopping are displayed as well at the second display device 4 as being matched with the position of the road shoulder 71' in the taken scenery 39. The symbol image 72 indicating the planned parking/stopping space may be displayed as an outline box shape. Here, to be easily recognizable on the screen of the monitor device 24 that is relatively small, the entire planned parking/stopping space may be lighted or blinked.

Further, a virtual vehicle of the own vehicle that parks/stops on the road shoulder 71 is displayed at the first display device 3 as a moving image of a virtual image 75 as being superimposed to the actual scenery 36. The virtual image 75 is displayed so that the virtual vehicle travels on the arrow of the symbol image 73 as having the arrow as the trajectory therefor. Specifically, the virtual image 75 appears to move out frontward from a position just in front of the front windshield 15 as illustrated in FIG. 21A and moves to and stops on the planned parking/stopping space indicated by the symbol image 72 illustrated in FIG. 21B.

Similarly, a virtual vehicle of the own vehicle that parks/stops on the road shoulder 71' is displayed as well at the second display device 4 as a moving image of a virtual image 75' as being superimposed to the taken scenery 39. The virtual image 75' is displayed so that the virtual vehicle travels on the arrow of the symbol image 73' as having the arrow as the trajectory therefor. Specifically, the virtual image 75' appears to move out frontward from a position just in front of the screen of the monitor device 24 as illustrated in FIG. 22A and moves to and stops on the planned parking/stopping space indicated by the symbol image 72' illustrated in FIG. 22B.

Thus, owing to that the virtual vehicle indicated by the virtual image 75, 75' stops on the planned parking/stopping space indicated by the symbol image 72, 72', the occupant can confirm in advance whether there is a sufficient space necessary for the own vehicle to perform parking/stopping on the road shoulder 71, 71'. Further, the occupant can confirm in advance whether no obstacle exists on the travel course to the planned parking/stopping space.

Figure 23A:
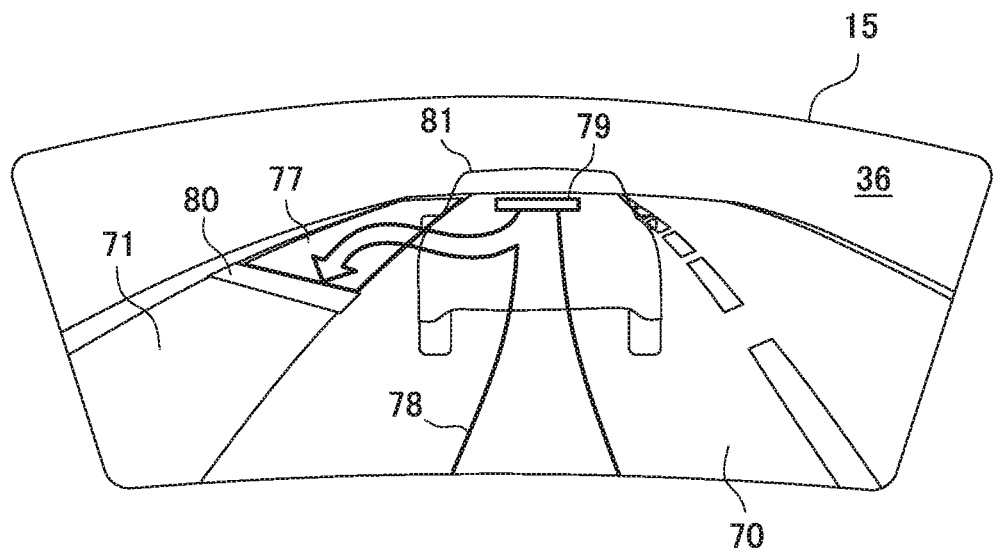
FIGS. 23A and 23B are schematic views illustrating screen displaying at the front windshield in the order of time passage in a case of performing parallel parking on a road shoulder.

FIGS. 23A and 23B and FIGS. 24A and 24B schematically illustrate a screen of prior notice displayed respectively at the first and second display devices 3, 4 in advance in a case that the own vehicle during travelling with automated driving performs parallel parking on the road shoulder 71, 71' of the road 70, 70' as being deviated from the scheduled travel course 37. As illustrated in FIG. 23A, instead of the symbol image indicating the scheduled travel course, symbol images 77, 78, 79, 80 respectively indicating a planned parallel parking space, a travel course for parallel parking, and first and second stop line marks for parallel parking are displayed at the first display device 3 as being matched with the position of the road shoulder 71 in the actual scenery 36.

The first stop line mark indicated by the symbol image 79 indicates a planned front end position when the own vehicle stops for heading-back for parallel parking. The second stop line mark indicated by the symbol image 80 indicates a planned rear end position when the own vehicle moves backward and stops on the planned parallel parking space. The arrow mark being the symbol image 78 indicating the travel course includes a first portion extending approximately straightly from a position just in front of the front windshield 15 to the symbol image 79 and a second portion extending therefrom in an opposite direction to a position where a leading end thereof reaches the symbol image 80 while performing lane change toward the road shoulder 71. Similarly to the above, the symbol image 77 indicating the planned parallel parking space may be displayed simply as an outline box shape.

Figure 24A:
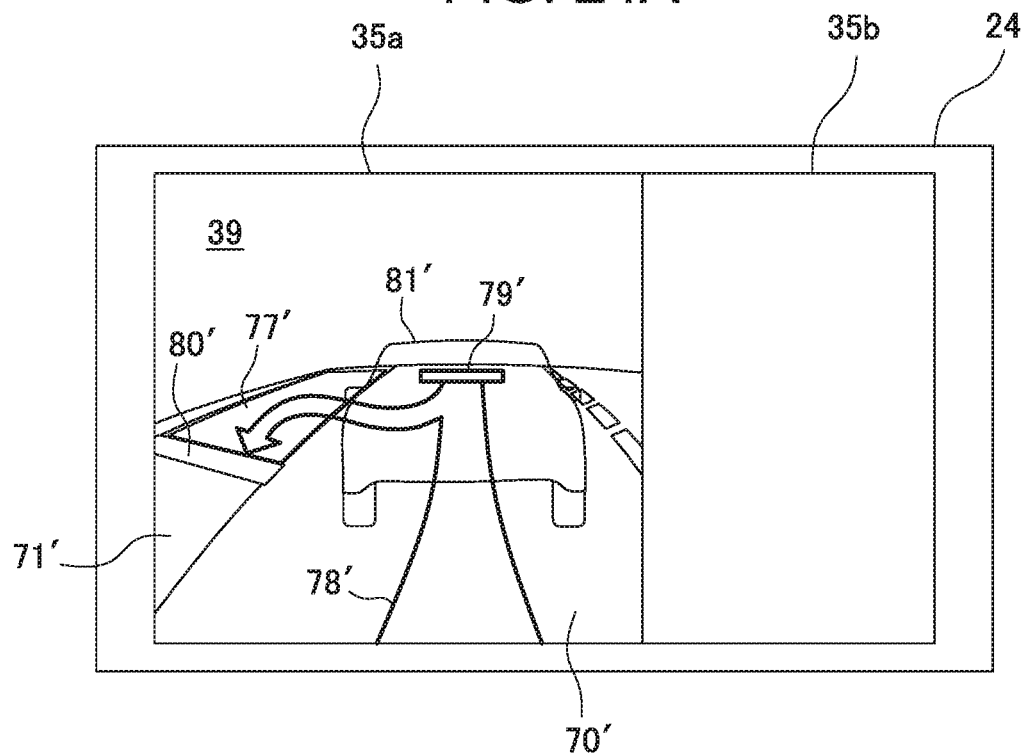
FIGS. 24A and 24B are schematic views illustrating screen displaying at the monitor device in the order of time passage in a case of the parallel parking of FIGS. 23A and 23B.

Similarly, as illustrated in FIG. 24A, instead of the symbol image indicating the scheduled travel course, symbol images 77', 78', 79', 80' respectively indicating a planned parallel parking space, a travel course for parallel parking, and first and second stop line marks for parallel parking are displayed as well at the second display device 4 as being matched with the position of the road shoulder 71' in the taken scenery.

The arrow mark being the symbol image 78' indicating the travel course includes a first portion extending approximately straightly from a position just in front of the screen of the monitor device 24 to the symbol image 79' and a position where a leading end thereof reaches the symbol image 80' while moving backward therefrom and performing lane change toward the road shoulder 71'. The symbol image 77' indicating the planned parallel parking space may be displayed simply as an outline box shape. Here, to be easily recognizable on the screen of the monitor device 24 that is relatively small, the entire planned parallel parking space may be lightened or blinked.

Further, a virtual vehicle of the own vehicle that parallel parks at the road shoulder 71 is displayed at the first display device 3 as a moving image of a virtual image 81 as being superimposed to the actual scenery 36. The virtual image 81 is displayed on the arrow of the symbol image 78 as having the arrow as the trajectory therefor.

Figure 23B:
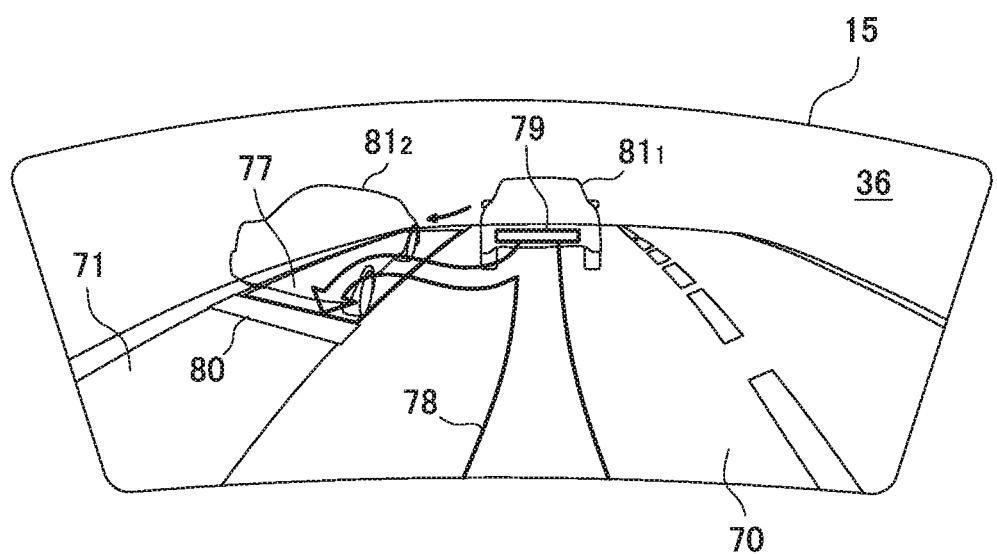

Specifically, as illustrated in FIG. 23A, the virtual image 81 appears to move out frontward from a position just in front of the front windshield 15 and moves straightly to the position of the symbol image 79 indicating the first stop line mark along the first portion of the symbol image 78. Then, as illustrated in FIG. 23B, a virtual image 811 stopped at the position of the symbol image 79 performs lane change toward the road shoulder 71 while moving backward along the second portion of the symbol image 78 to move onto the planned parallel parking space indicated by the symbol image 77, and then, stops at the position of the symbol image 80 indicating the second stop line mark.

Similarly, a virtual vehicle of the own vehicle that parallel parks at the road shoulder 71' is displayed at the second display device 4 as a moving image of a virtual image 81' as being superimposed to the taken scenery 39. The virtual image 81' is displayed on the arrow of the symbol image 78' as having the arrow as the trajectory therefor.

Figure 24B:
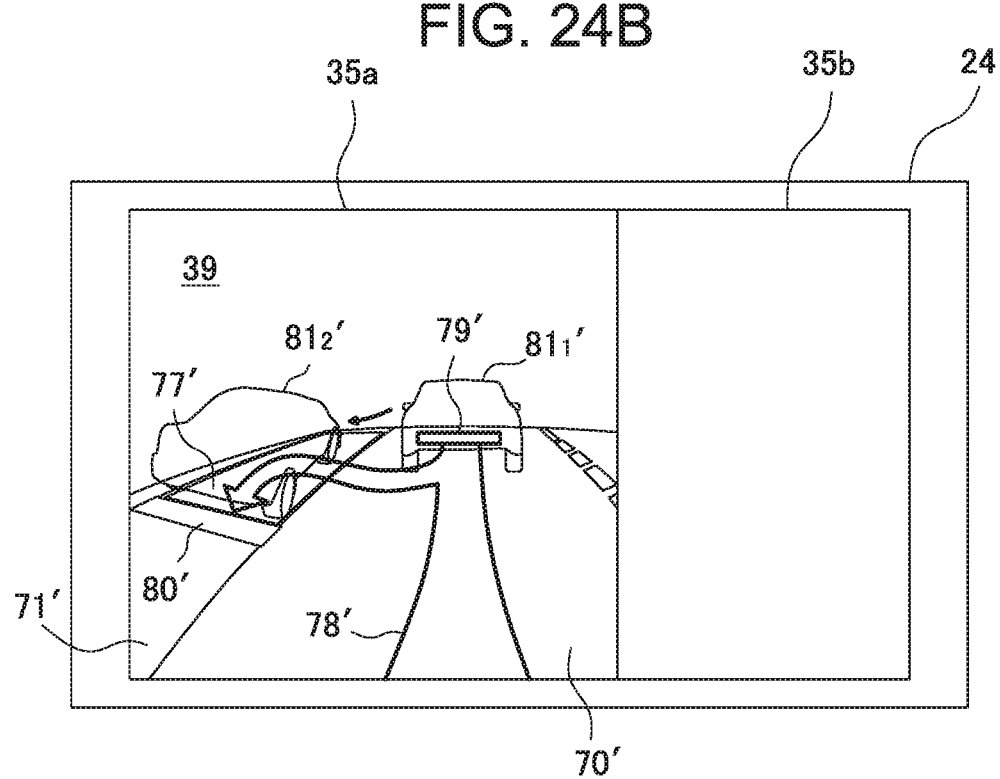

Specifically, as illustrated in FIG. 24A, the virtual image 81' appears to move out frontward from a position just in front of the screen of the monitor device 24 and moves straightly to the position of the symbol image 79' indicating the first stop line mark along the first portion of the symbol image 78'. Then, as illustrated in FIG. 24B, a virtual image 811' stopped at the position of the symbol image 79' performs lane change toward the road shoulder 71' while moving backward along the second portion of the symbol image 78' to move onto the planned parallel parking space indicated by the symbol image 77', and then, stops at the position of the symbol image 80' indicating the second stop line mark.

Thus, owing to viewing the virtual vehicle indicated by the virtual image 812, 812' stopped on the planned parallel parking space indicated by the symbol image 77, 77', the occupant can confirm in advance whether there is a sufficient space necessary for the own vehicle to perform parallel parking on the road shoulder 71, 71'. Further, the occupant can confirm in advance whether no obstacle exists on the travel course from heading-back at the symbol image 79, 79' to the planned parallel parking space.

Figure 25A:
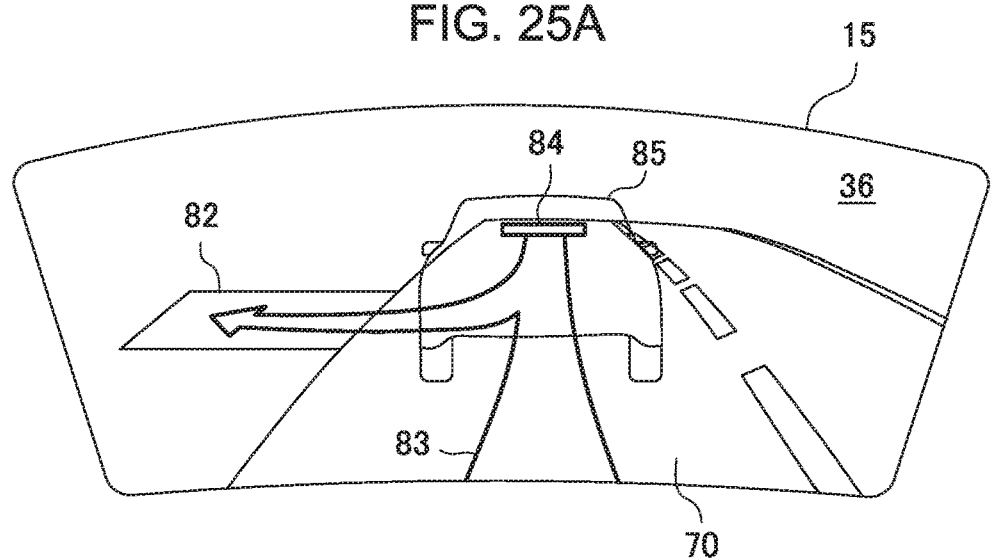
FIGS. 25A to 25C are schematic views illustrating screen displaying at the front windshield in the order of time passage in a case of performing backward parking at a parking space.

FIGS. 25A to 25C and FIGS. 26A to 26C schematically illustrate a screen of prior notice, in the order of time passage, displayed respectively at the first and second display devices 3, 4 in advance in a case that the own vehicle during travelling with automated driving performs backward parking at a parking space 82, 82' facing the road 70, 70' as being deviated from the scheduled travel course 37. As illustrated in FIG. 25A, instead of the symbol image indicating the scheduled travel course, symbol images 83, 84 respectively indicating a travel course for backward parking and a stop line mark for heading-back for backward parking are displayed at the first display device 3 as being matched with the position of the road 70 and the parking space 82 in the actual scenery 36.

The arrow mark being the symbol image 83 indicating the travel course includes a first portion extending approximately straightly from a position just in front of the front windshield 15 to the symbol image 84 and a second portion extending therefrom in an opposite direction to a position where a leading end thereof reaches the parking space 82 while changing orientation thereof toward a road side of the road 70 by 90 degrees. To make the position of the parking space 82 be easily recognizable for the occupant, for example, an outline box shape may be superimposed to the actual scenery 36.

Figure 26A:
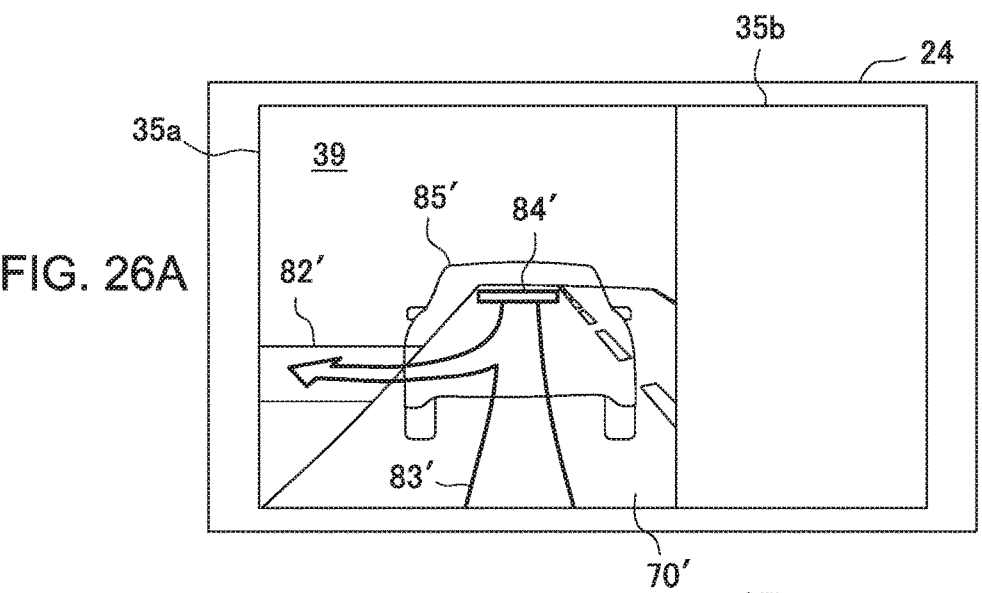
FIGS. 26A to 26C are schematic views illustrating screen displaying at the monitor device in the order of time passage in a case of the backward parking of FIGS. 25A to 25C.

Similarly, as illustrated in FIG. 26A, instead of the symbol image indicating the scheduled travel course, symbol images 83', 84' respectively indicating a travel course for backward parking and a stop line mark for heading-back for backward parking are displayed as well at the second display device 4 as being matched with the position of the road 70' and the parking space 82' in the taken scenery 39.

The arrow mark being the symbol image 83' indicating the travel course includes a first portion extending approximately straightly from a position just in front of the screen of the monitor device 24 to the symbol image 84' and a second portion extending therefrom in an opposite direction to a position where a leading end thereof reaches the parking space 82' while changing orientation thereof toward a road side of the road 70' by 90 degrees. Since the screen of the monitor device 4 is relatively small, it is preferable to add, for example, an outline box shape to make the position of the parking space 82' be easily recognizable for the occupant. Further, the position may be displayed as being lighted or blinked.

Further, a virtual vehicle of the own vehicle that performs backward parking at the parking space 82 is displayed at the first display device 3 as a moving image of a virtual image 85 as being superimposed to the actual scenery 36. The virtual image 85 is displayed on the arrow of the symbol image 83 as having the arrow as the trajectory therefor.

Figure 25B:
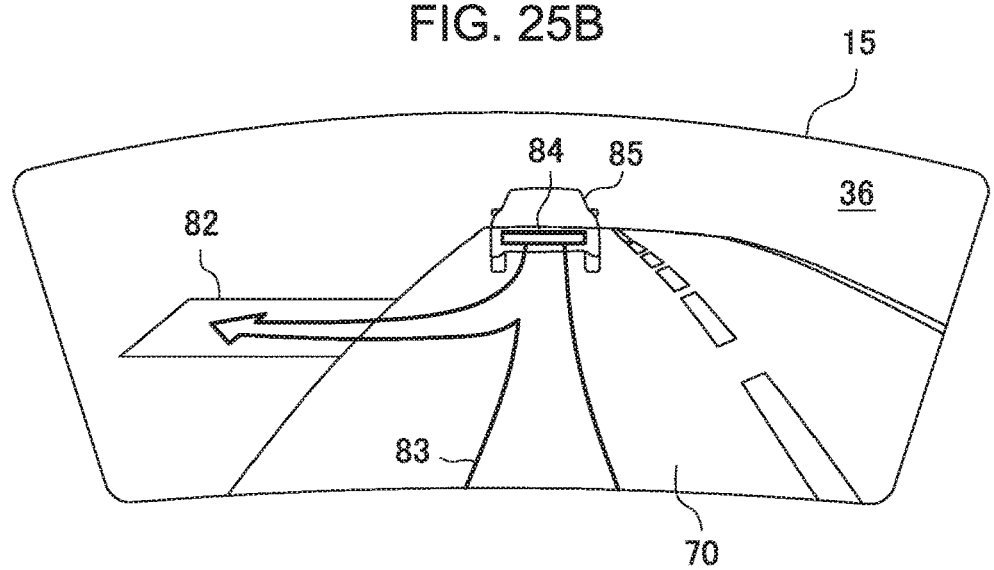
Figure 25C:
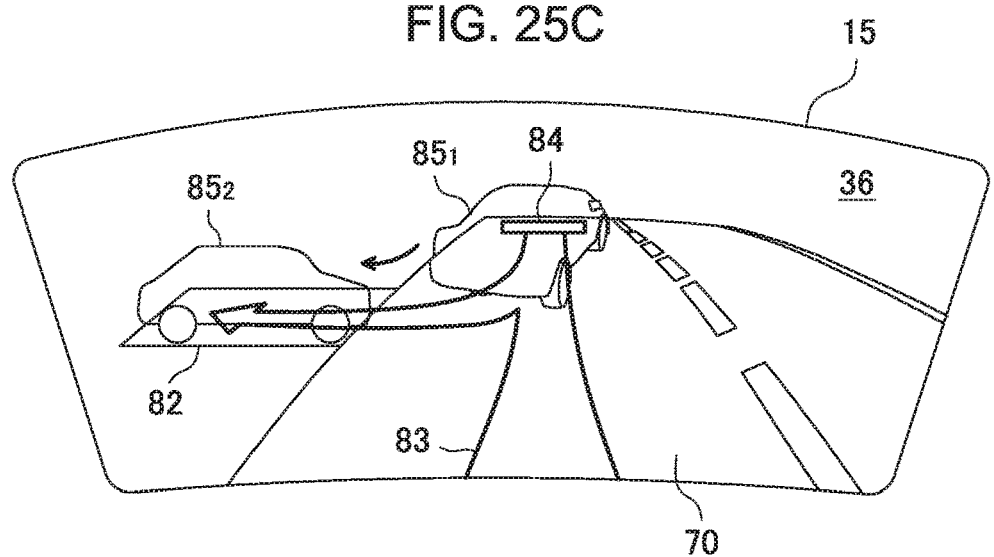

Specifically, the virtual image 85 appears to move out frontward from a position just in front of the front windshield 15 and moves straightly to the position of the symbol image 84 indicating the stop line mark along the first portion of the symbol image 83 as illustrated in FIG. 25A, and then, stops once at the position of the symbol image 84 as illustrated in FIG. 25B. Subsequently, as illustrated in FIG. 25C, the virtual image 851 moves backward along the second portion of the symbol image 83, changes orientation thereof toward a road side of the road 70 by 90 degrees, and moves to and stops at the parking space 82.

Similarly, a virtual vehicle of the own vehicle that performs backward parking at the parking space 82' is displayed at the second display device 4 as a moving image of a virtual image 85' as being superimposed to the taken scenery 39. The virtual image 85' is displayed on the arrow of the symbol image 83' as having the arrow as the trajectory therefor.

Figure 26B:
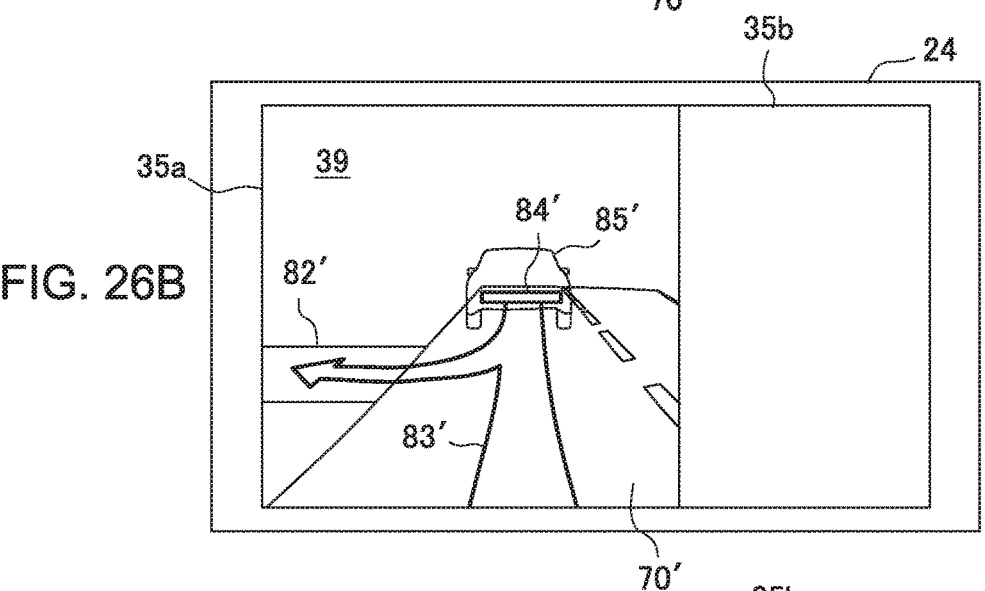
Figure 26C:
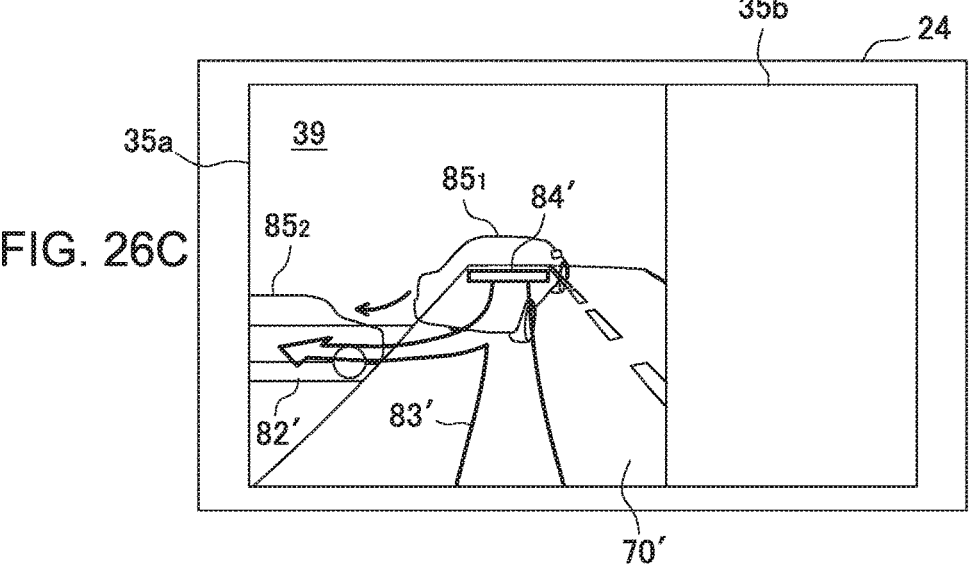

Specifically, the virtual image 85' appears to move out frontward a position just in front of the screen of the monitor device 24 and moves straightly to the position of the symbol image 84' indicating the stop line mark along the first portion of the symbol image 83' as illustrated in FIG. 26A, and then, stops once at the position of the symbol image 84' as illustrated in FIG. 26B. Subsequently, as illustrated in FIG. 26C, the virtual image 851' moves backward along the second portion of the symbol image 83', changes orientation thereof toward a road side of the road 70' by 90 degrees, and moves to and stops at the parking space 82'.

Thus, owing to that the virtual vehicle indicated by the virtual image 85, 85' virtually performs parking on each of the first and second display devices 3, 4, the occupant can confirm in advance whether the parking space 82, 82' has a sufficient space necessary for the own vehicle to perform parking thereat. Further, the occupant can confirm in advance whether no obstacle exists on the travel course from heading-back at the symbol image 84, 84' to the parking space 82, 82'.

Since the taken scenery 39 is displayed at the monitor device 24 being the second display device 4 as a background image, it is possible to additionally display, with relative ease, modifications and image processing that are difficult to be performed on actual scenery serving as a background image, and a variety of image displaying as well as symbol images indicating the travel courses, the stop line marks, and the like for the prior notice displaying, virtual images of the own vehicle, and rear view of following vehicles. For example, it is possible that a road surface of an aimed lane for lane change or parking/stopping is displayed in a color different from surroundings or is emphasized by being lighted or blinked, that an outline shape of an invisible obstacle behind a building is additionally displayed, and that a three-dimensional frame such as a box shape is displayed at a parking/stopping space as being superimposed.

In another embodiment, for providing prior notice of the next unscheduled travel behavior for the own vehicle with automated driving, it is possible to emit a prior notice sound to inform the occupant on the own vehicle of that prior notice has been displayed, in addition to displaying visual images described above at the first and second display devices 3, 4. Such a sound may be a signal sound such as a single beep and double beeps or a voice such as "lane change is to be performed".

It is preferable that the prior notice sound is emitted concurrently with prior notice displaying at the first and second display devices 3, 4. The prior notice sound may be emitted using a plurality of speakers 88 arranged to surround a driver's seat in the automobile 14, for example, as illustrated in FIG. 2 and controlled by the automated driving control unit 7 of the automated driving system 2. The speakers 88 may serve as apart of a surround stereo audio system that forms a three-dimensional sound field in the automobile 14.

In the above embodiments, description is provided on the vehicle image display system 1 that is applied to the automated driving system 2 whose automated degree is Level 3 to perform all of accelerating, steering, and braking of an automobile, However, the vehicle image display system of the present invention can be similarly applied as well to a system of Level 1 to automatically perform any of accelerating, steering, and braking, a system of Level 2 to automatically perform a plurality of operations among accelerating, steering, and braking, and a system of Level 4 to continue automated driving even in a case that an occupant does not respond to a drive-mode switching request from the system.

For example, in the case of Level 1, the automated driving system 2 evaluates a possibility of unscheduled travel behavior such as lane change, U-turn, and parking/stopping and causes the vehicle image display system 1 to display prior notice to prompt a driver to perform selection. In the case of performing only accelerating, the automated driving system 2 performs an accelerating operation in accordance with a steering and/or braking operation of the driver when lane change or the like is selected by the driver. Further, the automated driving system 2 of Level 1 performs steering in accordance with an accelerating and/or braking operation of the driver in the case of performing only steering, and performs braking in accordance with as accelerating and/or steering operation of the driver in the case of performing only braking. Thus, the automated driving system 2 of Level 1 assists an unscheduled travel behavior selected by a driver.

In the case that the automated driving system 2 is of Level 2 to perform accelerating and steering, when a driver selects an unscheduled travel behavior such as lane change, accelerating operations and steering operations are performed thereby excepting that the driver performs braking operations as required. Similarly, with the automated driving system 2 of Level 2 to perform accelerating and braking, an unscheduled travel behavior selected by a driver is performed while accelerating operations and braking operations are performed thereby excepting that the driver performs steering operations as required. With the automated driving system 2 of Level 2 to perform steering and braking, an unscheduled travel behavior selected by a driver is performed while steering operations and braking operations are performed thereby excepting that the driver performs accelerating operations as required.

In the abovementioned embodiment of Level 3, owing to that a driver or another occupant viewing prior notice of an unscheduled travel behavior manually performs, for example, an operation of a direction indicator corresponding to lane change or another operation, the automated driving system 2 can cause the unscheduled travel behavior to start. Further, in the case that the driver performs operation of the direction indicator or the like as planning to perform an unscheduled travel behavior such as lane change during automated driving, it is also possible that the automated driving system 2 evaluates advisability, danger, and the like of the unscheduled travel behavior and causes the vehicle image display system 1 to display notice of the evaluation. In the case of the automated driving system 2 of Level 4, operations therewith are substantially the same as those with the embodiment of Level 3 and description thereof will not be repeated.

In the above, description is provided in detail on preferable embodiments of the present invention. Here, not limited thereto, the present invention may be actualized with a variety of modifications within the technical scope thereof. For example, it is possible to arrange the display control unit 5 in the automated driving control unit 7. Further, it is also possible to integrate the display information storing unit 6 and the automated driving information storing unit 9 into a single storing unit.

EXPLANATION OF REFERENCES

1 Vehicle image display system
2 Automated driving system
3 First display device
4 Second display device
5 Display control unit
6 Display information storing unit
7 Automated driving control unit
8 Information input unit
9 Automated driving information storing unit
10 Accelerating system
11 Steering system
12 Braking system
13 Indicating system
14 Automobile
15 Front windshield
16 Front camera
18*a*, 18*b* Rear camera
20 Radar sensor
22 Dashboard
24 Head-up display device
31 Main display area
34 Display screen
35*a* Behavior display area
36 Actual scenery
37, 37', 44, 44', 53, 53', 61, 61', 68, 68', 72, 72', 73, 73', 74, 74', 77, 77', 78, 78', 79, 79', 80, 80', 83, 83', 84, 84' Symbol image
38, 38', 60, 60' Overtaking lane
39 Taken scenery
40 Picture image
45, 45', 51 Cruising lane
46, 46', 54, 54', 69, 69', 75, 75', 81, 81', 85, 85' Virtual image
49, 49', 49", 56, 56', 62, 62' Attention-calling mark
52, 52', 67, 67' Opposing lane
58, 58' Stop line mark
71, 71' Road shoulder
82, 82' Parking space

The invention claimed is:

1. A vehicle image display system for an automated driving system including an automated driving control unit for controlling an accelerating system, a steering system, and a braking system of an own vehicle to cause the own vehicle to travel with automated driving along a previously-set scheduled travel route to a destination in accordance with a scheduled travel behavior, the automated driving control unit controlling the own vehicle to perform an unscheduled travel behavior different from the scheduled travel behavior based on latest traffic information and a travel information of the own vehicle, the vehicle image display system comprising:

a display device configured to display a picture image visually indicating the scheduled travel behavior on a screen of the own vehicle for an occupant of the own vehicle; and a display control unit configured to generate a first symbol image indicating a scheduled travel course on a scheduled road during an automated driving by the automated driving control unit based on the travel information of the own vehicle from the automated driving control unit, and to control the display device to display the first symbol image on the screen in real time, wherein the display control unit is configured to generate a second symbol image indicating an unscheduled travel course deviating from the scheduled travel course based on the travel information of the own vehicle and an instruction received from the automated driving control unit when the automated driving control unit is trying to cause the own vehicle to perform the unscheduled travel behavior, and to control the display device to display the second symbol image on the screen in which the second symbol image is superimposed on the first symbol image, the display control unit is configured to generate the picture image indicating the own vehicle traveling in accordance with the scheduled travel course and to control the display device to display the picture image superimposed on the first symbol image, the display control unit is configured to generate a virtual image indicating a virtual vehicle of the own vehicle virtually traveling on the unscheduled travel course and to control the display device to display the virtual image superimposed on the second symbol image at an end point of the unscheduled travel course, wherein the virtual image is an image of a real vehicle, the display control unit is configured to control the display device so that, for travelling the virtual vehicle along the unscheduled travel course, the virtual image is superimposed on the second symbol image and the virtual vehicle traveling on the unscheduled travel course is repeatedly displayed as a moving image at a speed faster than that of the own vehicle on the first symbol image for visually providing a prior notice of the unscheduled travel behavior to the occupant, and the display control unit is configured to control the display device such that:

the second symbol image is superimposed on the first symbol image to display the unscheduled travel route different from the scheduled travel route, the virtual image is superimposed on the second symbol image, and the picture image is superimposed on the first symbol image, the second symbol image, and the virtual image, when the own vehicle travels in accordance with the unscheduled travel behavior, the virtual image is moved along the second symbol image to gradually approach from an end point to a leading point of the second symbol image, and the virtual image is displayed after a lane change is previously noticed to the occupant to perform the unscheduled travel behavior until the lane change is completed, and is erased after the lane change is completed.

2. The vehicle image display system according to claim 1, wherein each of the first and second symbol images has a shape of an arrow mark, which is tapered from an own vehicle side toward a front side of the own vehicle, and the display control unit is configured to control the display device to display ends of the first and second symbol images on the own vehicle side overlapping each other, each of the ends of the first and second symbol images on the own vehicle side being a starting point of the arrow mark.

3. The vehicle image display system according to claim 1, wherein the display device includes a head-up display device for applying a front windshield of the own vehicle as the screen, and the display control unit is configured to control the display device to position the picture image with respect to an actual scenery viewed through the front windshield serving as a background image, based on the travel information of the own vehicle received from the automated driving control unit.

4. The vehicle image display system according to claim 1, further comprising:

a camera mounted on the own vehicle for capturing a scenery of a front side of the own vehicle, wherein the display device includes a monitor device mounted on a dashboard of the own vehicle and connected to the camera, and the display control unit is configured to display the moving image on the display device in real time with the scenery of the front side of the own vehicle captured by the camera as a background image, and to position the picture image with respect to the scenery based on the travel information of the own vehicle received from the automated driving control unit.

5. The vehicle image display system according to claim 1, wherein the unscheduled travel behavior is defined as performing the lane change for moving the own vehicle to a lane different from the lane on the scheduled travel course, parking/stopping of the own vehicle in a parking space out of the scheduled travel course, or making a U-turn to move the own vehicle in a direction opposite to a previous traveling direction of the own vehicle as being deviated from the scheduled travel course on a road previously set along the travel route by the automated driving system, and the end point of the unscheduled travel course on the second symbol image is defined as a location on the lane different from the lane on the scheduled travel course in performing the lane change, the parking space in the parking/stopping of the own vehicle, and a U-turn location on a lane for traveling in the direction opposite to the previous traveling direction in making the U-turn.

6. The vehicle image display system according to claim 5, wherein the unscheduled travel behavior includes a temporary stop on the unscheduled travel course when performing the lane change, parking/stopping, or making the U-turn.

7. The vehicle image display system according to claim 1, wherein the display control unit is configured to control the display device to display the picture image indicating the own vehicle to follow the second symbol image after the own vehicle starts traveling on the unscheduled travel course, and to erase the picture image indicating the virtual vehicle of the own vehicle displayed at the end point of the unscheduled travel course when the own vehicle is at the end point of the unscheduled travel course.

8. An automated driving system comprising:

the vehicle image display system according to claim 1, and the automated driving control unit for controlling the accelerating system, the steering system, and the braking system of the own vehicle to cause the own vehicle to travel with automated driving along the previously-set scheduled travel route to the destination in accordance with the scheduled travel behavior, the automated driving control unit controlling the own vehicle to perform the unscheduled travel behavior that is different from the scheduled travel behavior based on the latest traffic information and the travel information of the own vehicle.

* * * * *